United States Patent
Suzuki et al.

(10) Patent No.: US 8,211,574 B2
(45) Date of Patent: Jul. 3, 2012

(54) LITHIUM ION SECONDARY BATTERY

(75) Inventors: Kohei Suzuki, Yao (JP); Tsumoru Ohata, Kyoto (JP); Junji Nakajima, Osaka (JP); Akiko Fujino, Suita (JP); Shigeo Ikuta, Kawanabe-gun (JP); Tetsuya Hayashi, Kadoma (JP); Yusuke Fukumoto, Moriguchi (JP); Shinji Kasamatsu, Katano (JP)

(73) Assignee: Panasonic Corporation, Osaka (JP)

( * ) Notice: Subject to any disclaimer, the term of this patent is extended or adjusted under 35 U.S.C. 154(b) by 993 days.

(21) Appl. No.: 10/568,536

(22) PCT Filed: Sep. 13, 2004

(86) PCT No.: PCT/JP2004/013704
§ 371 (c)(1),
(2), (4) Date: Feb. 17, 2006

(87) PCT Pub. No.: WO2005/029614
PCT Pub. Date: Mar. 31, 2005

(65) Prior Publication Data
US 2006/0194116 A1   Aug. 31, 2006

(30) Foreign Application Priority Data

Sep. 18, 2003  (JP) .................. 2003-325852
Sep. 22, 2003  (JP) .................. 2003-329739
Dec. 17, 2003  (JP) .................. 2003-419968
Dec. 19, 2003  (JP) .................. 2003-422536
Jan. 19, 2004  (JP) .................. 2004-010423

(51) Int. Cl.
*H01M 4/68* (2006.01)
(52) U.S. Cl. ...................... 429/247; 429/251

(58) Field of Classification Search .................. None
See application file for complete search history.

(56) References Cited

U.S. PATENT DOCUMENTS 5,882,721 A   3/1999   Delnick
(Continued)

FOREIGN PATENT DOCUMENTS

EP   0 814 520   12/1997
(Continued)

OTHER PUBLICATIONS

The melting point of polyacrylonitrile retrieved from <http://scientificpolymer.com/catalog/description.asp?QProductCode=134> on Mar. 27, 2010.*

(Continued)

*Primary Examiner* — Cynthia Lee
(74) *Attorney, Agent, or Firm* — McDermott Will & Emery LLP

(57) ABSTRACT

A lithium ion secondary battery includes a positive electrode capable of absorbing and desorbing lithium ion, a negative electrode capable of absorbing and desorbing lithium ion, a porous film interposed between the positive electrode and the negative electrode, and a non-aqueous electrolyte, the porous film being adhered to a surface of at least the negative electrode. The porous film includes an inorganic filler and a first binder. The content of the first binder in the porous film is 1.5 to 8 parts by weight per 100 parts by weight of the filler. The first binder includes a first rubber including an acrylonitrile unit. The first rubber is water-insoluble and has a decomposition temperature of 250° C. or higher. The negative electrode includes a negative electrode active material capable of absorbing and desorbing lithium ion and a second binder, and the second binder includes a second rubber particle and a water-soluble polymer.

9 Claims, 5 Drawing Sheets

U.S. PATENT DOCUMENTS

| | | | |
|---|---|---|---|
| 5,928,812 A * | 7/1999 | Xue | 429/304 |
| 5,948,464 A * | 9/1999 | Delnick | 427/77 |
| 6,365,299 B1 | 4/2002 | Miyaki et al. | |
| 6,432,586 B1 | 8/2002 | Zhang | |
| 6,562,511 B2 * | 5/2003 | Daroux et al. | 429/144 |
| 2002/0037450 A1 * | 3/2002 | Suzuki et al. | 429/94 |
| 2002/0168570 A1 * | 11/2002 | Hampden-Smith et al. | 429/218.1 |
| 2002/0192561 A1 | 12/2002 | Noh | |
| 2003/0165739 A1 * | 9/2003 | Kizu et al. | 429/231.3 |

FOREIGN PATENT DOCUMENTS

| | | |
|---|---|---|
| EP | 0 954 042 A1 | 11/1999 |
| EP | 1 291 952 A1 | 3/2003 |
| JP | 07-220759 | 8/1995 |
| JP | 09-147916 | 6/1997 |
| JP | 10-055718 | 2/1998 |
| JP | 10-106530 | 4/1998 |
| JP | 11-144706 | 5/1999 |
| JP | 2000-021386 | 1/2000 |
| JP | 2001-006744 | 1/2001 |
| JP | 2002-008730 | 1/2002 |
| JP | 2003-249206 | 9/2003 |
| JP | 2004-327183 | 11/2004 |
| WO | WO 99/36981 | 7/1999 |

OTHER PUBLICATIONS

European Search Report issued in European Patent Application No. 04773323.3-2119, mailed Sep. 3, 2009.

* cited by examiner

F I G. 7
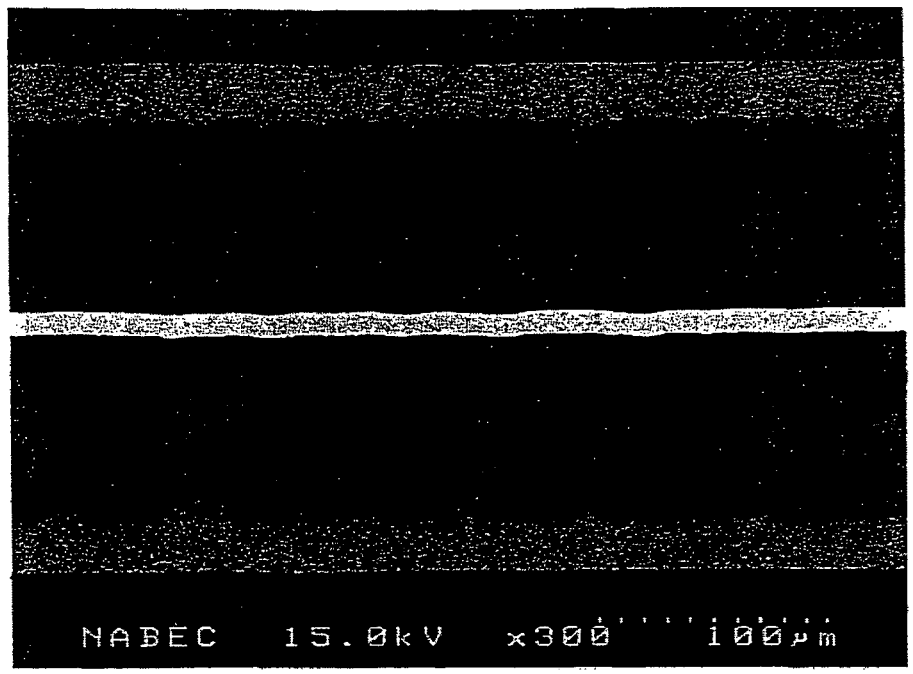
F I G. 8
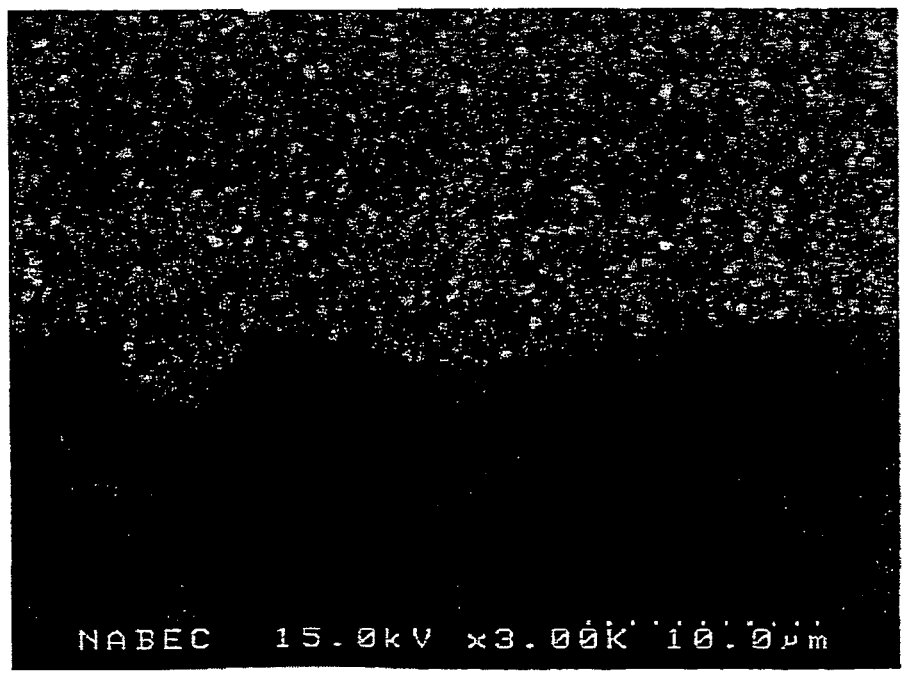

US 8,211,574 B2

LITHIUM ION SECONDARY BATTERY

RELATED APPLICATION

This application is a national phase of PCT/JP2004/013704 filed on Sep. 13, 2004, which claims priority from Japanese Application Nos. JP 2003-325852 filed Sep. 18, 2003; JP 2003-329739 filed Sep. 22, 2003; JP 2003-419968 filed Dec. 17, 2003; JP 2003-422536 filed Dec. 19, 2003;and JP 2004-010423 filed Jan. 19, 2004 the disclosures of which Applications are incorporated by reference herein. The benefit of the filing and priority dates of the International and Japanese Applications is respectfully requested.

TECHNICAL FIELD

The present invention relates to a lithium ion secondary battery having a porous film adhered to a surface of at least a negative electrode, the porous film comprising a filler and a binder. The lithium ion secondary battery of the present invention has a low occurrence rate of a short circuit and is excellent in safety in terms of heat resistance and the like.

BACKGROUND ART

As electronic devices are becoming more and more portable and wireless, small and lightweight lithium ion secondary batteries with a higher energy density are gaining attention as the power source for these devices. Lithium ion secondary batteries have a positive electrode comprising a lithium-containing transition metal oxide or the like, a negative electrode comprising a carbon material or the like, a separator interposed between the positive electrode and the negative electrode, and a non-aqueous electrolyte.

For the separator of lithium ion secondary batteries, a drawn resin film (a sheet separator) is used generally. For the raw material of the resin film, polyolefins such as polyethylene and polypropylene are used. However, resin films have low heat resistance in many cases, and heat-shrinkage is caused when the film is exposed to a high temperature. Particularly under an environment of over 150° C., the shrinkage of resin film may cause deterioration of the battery safety. Particularly, when a sharp-pointed object such as a nail penetrates the battery (at the time of nail penetration test), a short circuit portion expands due to a short circuit reaction heat which is generated instantly, causing further reaction heat, raising a possibility of an acceleration of abnormal overheat.

As schematically shown in FIG. 4, there has been proposed a usage of a paste electrolyte 40 for the function of a separator. The paste electrolyte 40 includes a great amount of liquid electrolyte 41 including a thickener, and an electrically insulating filler 42. The filler 42 functions as a spacer between a positive electrode 43 and a negative electrode 44 (Japanese Laid-Open Patent Publication No. Hei 10-55718). Since the paste electrolyte is a composite material of a liquid electrolyte in which a viscosity is enhanced by the thickener and of an electrically insulating filler, liquid electrolyte is sufficiently included therein. Therefore, the paste electrolyte is excellent in that a certain level of lithium ion conductivity can be secured. However, there are defects that the strength thereof as a separator is insufficient and that the practicality is poor.

Further, there has been proposed a technology to form a porous film including a filler comprising inorganic particles on a surface of a sheet separator comprising a resin film (Japanese Laid-Open Patent Publication No. 2001-319634, and Japanese Laid-Open Patent Publication No. 2002-8730). However, since the porous film is formed on the surface of the sheet separator in these proposals, there are defects that the porous film shrinks as the sheet separator shrinks. These techniques are aiming at suppression of a lithium dendrite growth and an improvement in high-rate discharge characteristic in the first place, and are not able to ensure the safety at the time of an internal short circuit or nail penetration.

On the other hand, there has been proposed a technique in which a porous film comprising a resin with a low glass transition temperature is formed on an electrode (Japanese Laid-Open Patent Publication No. Hei 11-144706). This proposal is intended to develop the shutdown effect by softening the resin with a low glass transition temperature when a heat is generated due to a short circuit. In such proposal, for example in a nail penetration test, due to the generated heat at the time of an internal short circuit, the temperature locally exceeds several hundred ° C. depending on conditions, causing excessive softening or burning of resin. As a result, porous film deforms, and may cause an abnormal overheating. Therefore, the shutdown mechanism of the resin cannot be an absolute safety mechanism for the internal short circuit.

There has been also proposed a technique to form a protective layer comprising inorganic particles such as alumina or the like, and a water-soluble polymer on an electrode (Japanese Laid-Open Patent Publication No. Hei 9-147916). For the water-soluble polymer, a polyacrylic acid derivative, a cellulose derivative, and the like are used. Based on this proposal, since the protective layer includes inorganic particles with excellent heat resistance, suppression of the deformation of the protective layer itself at the time of heat generation due to short circuit can be expected.

However, currently, for a negative electrode of lithium ion secondary batteries, styrene-butadiene copolymer (SBR) or rubber particles comprising a modified product thereof are generally used as a negative electrode binder in many cases. This is because in the case of rubber particles, only a small usage amount is necessary, compared with the case of polyvinylidene fluoride (PVDF) conventionally used as a negative electrode binder, and lithium ion acceptability of negative electrode improves.

In the case where rubber particles are to be included in a negative electrode material mixture, usually, a thickener comprising water-soluble polymer should be used together with the rubber particles. For the water-soluble polymer, cellulose resin is the mainstream material. When a protective layer including the water-soluble polymer is applied on such negative electrode, the thickener in the negative electrode swells by water included in the protective layer before drying, causing a deformation of the negative electrode. Although the negative electrode circumvented the deformation can be applied to a practical use, the yield drops dramatically.

Also, there has been examined a separator provided by forming a thin film of paste including a resin binder dissolved in a solvent, and a filler on a surface of a positive electrode or a negative electrode, and then drying the formed film (Japanese Laid-Open Patent Publication No. Hei 10-106530). In such paste, fluorocarbon resin, polyolefin resin, or the like is included as the resin binder. Such separator is excellent in that a certain level of strength is secured. However, when the resin binder deposits on the surfaces of filler particles after dissolved in a solvent, as schematically shown in FIG. 5, the areas of filler particles 52 covered with a resin binder 51 become large. As a result, gaps among filler particles decrease while strength increases, causing an insufficient moving path between a positive electrode 53 and a negative electrode 54 for the liquid electrolyte or lithium ion to move. Additionally, although many techniques have been proposed to form a paste thin film including a resin binder dissolved in a solvent and a filler on a surface of a positive electrode or a negative electrode, the same problems will occur (Japanese Laid-Open Patent Publication No. Hei 7-220759, Patent Publication No. 3371301, Patent Publication No. 3426253).

DISCLOSURE OF INVENTION

The present invention aims to improve the safety of a lithium ion secondary battery, while preventing a deformation of a negative electrode having a higher lithium ion acceptability, by adhering a porous film excellent in heat resistance to a surface of at least the negative electrode.

That is, the present invention relates to a lithium ion secondary battery comprising a positive electrode capable of absorbing and desorbing lithium ion, a negative electrode capable of absorbing and desorbing lithium ion, a porous film interposed between the positive electrode and negative electrode, and a non-aqueous electrolyte: wherein the porous film is adhered to a surface of at least the negative electrode; the porous film comprises an inorganic filler and a first binder; a content of the first binder in the porous film is 1.5 to 8 parts by weight per 100 parts by weight of the inorganic filler; the first binder comprises a first rubber including an acrylonitrile unit; the first rubber is water-insoluble and has a decomposition temperature of 250° C. or higher; the negative electrode comprises a negative electrode active material capable of absorbing and desorbing lithium ion and a second binder; and the second binder includes a second rubber particle and a water-soluble polymer.

A stacked-type battery can be obtained when the positive electrode and the negative electrode are stacked with the porous film interposed therebetween, and a wound-type battery can be obtained when the positive electrode and the negative electrode are spirally wound with the porous film interposed therebetween. The present invention is applicable to any type of the battery.

Since the porous film is quite excellent in heat resistance and is being adhered to an electrode surface, the porous film does not shrink by heat, rendering the deformation by softening or burning difficult. Therefore, a safe lithium ion secondary battery can be obtained. Also, since the first binder included in the porous film is water-insoluble, drops in yields due to the deformation of the negative electrode can be avoided, even when the porous film is combined with a high performance negative electrode including a thickener comprising a water-soluble polymer. It is desirable that the thickness of the porous film is 0.5 µm or more and 20 µm or less.

In the porous film, it is desirable that the first binder has no crystalline melting point or has a crystalline melting point of 250° C. or higher. It is desirable that the first rubber comprises core-shell type particles and has an adhesive surface portion. Also, it is desirable that the first rubber includes a polyacrylonitrile chain.

It is desirable that in the negative electrode, the water-soluble polymer includes a methylcellulose unit. It is desirable that the second rubber particle includes a styrene unit and a butadiene unit.

The present invention also aims to effectively prevent a short circuit of lithium ion secondary battery by optimizing the balance between lithium ion acceptability of negative electrode and lithium ion permeability of porous film.

That is, it is desirable that a content of the second binder in the negative electrode is 1.5 to 3 parts by weight per 100 parts by weight of the negative electrode active material. Within this range, the balance between lithium ion acceptability of negative electrode and lithium ion permeability of porous film can be maintained at optimal condition.

When the negative electrode includes a great amount of the binder, the surface of the negative electrode active material is covered with the binder for the most part, to decrease lithium acceptability of the negative electrode. When lithium ion acceptability of negative electrode declines in a battery having no porous film, metallic lithium deposits at gaps between the negative electrode and the sheet separator. The drawbacks involved with such state are developed as an increase in irreversible capacity over a long period of time. On the other hand, when the porous film is attached on a surface of the negative electrode, since there is no gap between the negative electrode and the separator, metallic lithium deposits in the porous film. As a result, a defect occurs as a short circuit over a short period of time. By setting the content of the second binder in the negative electrode to 1.5 to 3 parts by weight per 100 parts by weight of the negative electrode active material, such defect can be suppressed.

Additionally, by optimizing the balance of lithium acceptability of negative electrode and lithium ion permeability of porous film, a lithium ion secondary battery excellent in high-rate characteristic can be obtained, in addition to suppressing the occurrence of defects.

The present invention also aims to achieve a higher safety by using a combination of a porous film excellent in heat resistance and a conventional sheet separator.

That is, by further providing a separator interposed between the positive electrode and the negative electrode to a lithium ion secondary battery of the present invention, a higher safety can be achieved. It is preferable that the thickness of the separator is 8 µm or more and 30 µm or less.

The present invention also aims to achieve a higher yield by controlling the surface roughness of the porous film.

That is, it is preferable that the surface roughness of the porous film is smaller than the surface roughness of an electrode surface to which the porous film is adhered, in view of preventing a separation of a material mixture from the electrode and a decline in yield. By making the surface roughness on the electrode surface small, a separation of the material mixture during a process involving frictions can be suppressed, to improve yields.

For example, in the case of negative electrode, when a needle-shaped graphite is used for the active material, compared with the case when a flake graphite is used, the surface roughness of the surface of the negative electrode increases, causing a tendency to decrease yields. In such a case as well, by decreasing the surface roughness of the porous film formed on the surface of the negative electrode, the separation of material mixture can be prevented effectively. The separation of material mixture is likely to occur when a filler harder than the electrode active material is disposed along the asperities of the electrode surface.

By making the surface of porous film more smooth than the electrode surface, which is the base of the porous film, separation of the material mixture due to friction, which can happen in the conventional lithium ion secondary battery having no porous film as well, can be suppressed, to greatly decrease defects of internal short circuit caused mainly by separation, and to increase yields.

Based on such, an electrode plate with a greater surface roughness can be applicable to a practical use. Therefore, a material which has been considered inapplicable for usage conventionally can be selected as an active material, improving versatility of a high performance lithium ion secondary battery.

In order to sufficiently adhere the porous film to a surface of an electrode, which is a base, it is desirable that the content of the inorganic filler included in the porous film is 99 wt % or below.

It is desirable that in the porous film, the inorganic filler comprises an inorganic oxide. It is desirable that the surface of the inorganic oxide is alkaline, and that the inorganic oxide has a BET specific surface area of 0.9 $m^2/g$ or more. It is known that when a filler having an alkaline site on the surface thereof and a polymer having an acidic group are mixed, acidic group of the polymer makes bonding with the alkaline site of the filler (Ref. Development Technology of Functional Filler, CMC Publishing CO., LTD, pp. 37-47).

Many binders produce an acidic group by oxidation or reduction in a battery. Among the binders, rubber particles are especially apt to hold an acidic group. When producing a battery having a wound-type electrode plate group, in many cases, rubber particles are used as an electrode binder, since the electrode plate needs to have flexibility. When the acidic group captures lithium ion in the battery, desired battery performance cannot be obtained, and the life of rubber particles is shortened at the same time. On the other hand, when the acidic group of the binder makes bonding with the alkaline site of the filler, the lithium-capturing by the acidic group is suppressed due to a formation of a block product, which enables the prevention of the above defects.

It is desirable that the inorganic oxide includes at least one selected from the group consisting of alumina and titanium oxide. In view of obtaining sufficient electrolyte-resistance, it is desirable that α-alumina is used particularly, among alumina. Also, since the particle size of titanium oxide can be easily controlled to 0.1 μm or below relatively, titanium oxide is suitable for controlling the filled in structure, porosity, and pore size of the porous film. Since titanium oxide has a lower degree of hardness compared with alumina, which is also used as abrasives, titanium oxide is also excellent with regard to the point that a kneader pot will not be damaged at the time of preparing a material paste for porous film. Although a usage of silica as an inorganic oxide has also been proposed, alumina and titanium oxide are preferable in view of battery life and reliability, since silica may be eroded by non-aqueous electrolyte.

It is desirable that the inorganic filler comprises a mixture of a large particle group and a small particle group, and the average particle size A of the large particle group and the average particle size B of the small particle group satisfy the formula (1):

$$0.05 \leq B/A \leq 0.25.$$

BRIEF DESCRIPTION OF DRAWINGS

FIG. 7 is an SEM photograph of a cross section of a negative electrode of the present invention.

FIG. 8 is an SEM photograph of a cross section of a porous film of the present invention.

BEST MODE FOR CARRYING OUT THE INVENTION

Figure 1:
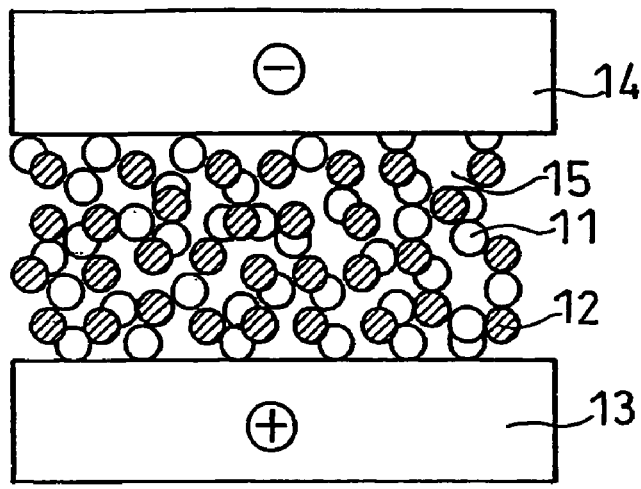
FIG. 1 is a view schematically showing a structure of a porous film of the present invention.

In the present invention, a porous film interposed between a positive electrode and a negative electrode comprises an inorganic filler and a first binder. The porous film has to be adhered to a surface of at least the negative electrode. This is because in lithium ion secondary batteries, the width of the negative electrode is designed to be larger than the width of the positive electrode, to prevent an electric current from concentrating on an edge of the negative electrode.

Even though a porous film is formed on a sheet separator, the porous film shrinks when the separator shrinks. Therefore, when a great amount of heat is generated by a short circuit, the shrinkage of the porous film with the separator cannot be avoided, regardless of the heat resistance of the porous film itself.

Also, when an independent sheet composed of a sole porous film is to be formed, in view of keeping its sheet form, its thickness should be made very large, and a great amount of the binder becomes necessary. Therefore, in view of battery characteristics and design capacity, it is less practical to form an independent sheet of the porous film alone.

Additionally, by forming the porous film adhered to a surface of an electrode, asperities of the surface of an electrode material mixture layer are covered with the porous film, making the friction of electrode surface small. As a result, a separation of the material mixture can be suppressed effectively.

The first binder content in the porous film needs to be 1.5 to 8 parts by weight per 100 parts by weight of the filler. When the first binder content is less than 1.5 parts by weight, a porous film with sufficient strength cannot be obtained, and when the first binder content is over 8 parts by weight, gaps in the porous film become insufficient, decreasing lithium ion permeability to lower rate characteristic. Also, a control of the microporous structure formed by the gaps among filler particles becomes difficult.

The first binder has to be water-insoluble.

The reason is that the most of high performance negative electrodes include a water-soluble polymer such as cellulose resin as a thickener. If the first binder is water-soluble, the first binder has to be dissolved in water at the time of preparing a raw material paste for porous film. When such raw material paste is applied on the negative electrode, the water-soluble polymer in the negative electrode swells by water included in the raw material paste for porous film. In this case, the negative electrode deforms to cause a disadvantage such as a drastic decrease in yields.

Herein, "the binder is water-insoluble" means that a substantially uniform solution cannot be obtained even the binder is mixed with water. On the contrary, it is desirable that the binder dissolves homogenously in an organic solvent.

In the porous film, it is preferable that a rubber (a first rubber) including an acrylonitrile unit, desirably a polyacrylonitrile chain, is used as the first binder entirely or partly. The first rubber including a polyacrylonitrile chain has a higher decomposition temperature, due to the heat resistance inherent in polyacrylonitrile (the softening point of 250 to 350° C., the decomposition temperature of 350° C.).

It is preferable that the first rubber is particulate. When the first rubber is particulate, point-adhesion is possible between filler particles, so that sufficient binding effect can be obtained even with a small amount thereof. The state of point-adhesion is schematically shown in FIG. 1. Since filler particles 12 are adhered to each other by a first rubber 11 with point adhesion, many gaps 15 are secured between a positive electrode 13 and a negative electrode 14. Therefore, movements of an electrolyte or lithium ion will not be prevented drastically. Thus, the lithium ion conductivity is sufficiently secured and an excellent rate characteristic can be maintained. Also, based on the point-adhesion, the strength of the separator can be secured, even with a small usage of the first rubber.

It is desirable that the first rubber is core-shell type rubber particles having an adhesive surface portion. This is because the core-shell type rubber particles can exert sufficient binding effect even with a small amount thereof, securing more gaps in the porous film and sufficient moving path for the liquid electrolyte or lithium ion.

It is preferable that the core-shell type rubber particles further include an acrylate unit, other than the acrylonitrile unit. Additionally, it is preferable that the acrylate unit forms the adhesive surface portion. For the acrylate unit, 2-ethylhexyl acrylate is suitable.

The binder having rubber elasticity is excellent also in the sense that impact resistance is given to the porous film. The porous film including the first rubber as a binder is resistant to cracking when winding the positive electrode and the negative electrode. Therefore, higher yields for a battery including a wound-type electrode plate group can be maintained. On the other hand, in the case of the porous film including a hard binder with no rubber elasticity, there is a concern for occurrence of cracks during the manufacturing process of a wound-type battery.

As preferable examples of the first rubber, modified acrylonitrile rubbers such as BM-500B and BM-720H manufactured by Zeon Corporation can be mentioned, for example, and these are commercially available.

When using a first binder comprising plural kinds of resin material for the porous film, it is preferable that the ratio of the first rubber relative to the first binder as a whole is 20 to 80 wt %. When the first rubber is particulate, the average particle size of the particles is preferably 0.05 to 0.3 μm, in terms of obtaining a porous film with well-balanced strength and porosity.

When selecting the resin material used for a battery, the stability of resin derived from Molecular Orbital method (HOMO/LUMO) is used as an indicator, conventionally. Based on such indicator, generally, single component resins or a combination thereof (copolymer) is selected. Therefore, rubber including a polyacrylonitrile chain, which is unstable under the negative electrode potential, is hardly selected, from a conventional viewpoint.

When a first binder comprising plural kinds of resin material is used in the porous film, for the resin material other than the first rubber, fluorocarbon resin such as polyvinylidene fluoride (PVDF), cellulose resin such as carboxymethyl cellulose (CMC), or polyvinylpyrrolidone (PVP) can be used. Also, in view of giving an appropriate viscosity to the raw material paste for porous film, it is preferable that fluorocarbon resin (for example, PVDF with a molecular weight of 100000 to 1000000) is used in combination with the first rubber.

In the core-shell type rubber particles including a polyacrylonitrile chain and an acrylate unit, in terms of balance between adhesiveness and rubber elasticity, it is preferable that the absorption intensity based on C=O stretching vibration is 3 to 50 times the absorption intensity based on C≡N stretching vibration of the acrylonitrile unit, in absorption spectrum of rubber particles obtained by an FT-IR measurement. When the absorption intensity based on C=O stretching vibration is less than 3 times the absorption intensity based on C≡N stretching vibration, binding effect of the rubber particles becomes insufficient, and when the absorption intensity based on C=O stretching vibration is over 50 times, rubber elasticity of the rubber particles becomes insufficient, to weaken the strength of the porous film. The absorption intensity refers to the height of absorption peak seen from the base line of the spectrum.

In the FT-IR measurement, absorption spectrum of the core-shell type rubber particles can be measured by using a sample in which the rubber particles are applied on a KBr plate, for example. Generally, the absorption based on C=O stretching vibration is observed around 1700 to 1760 $cm^{-1}$, and the absorption based on C≡N stretching vibration is observed around 2200 to 2280 $cm^{-1}$.

In the porous film, the first rubber has to have a decomposition temperature of 250° C. or more. Also, when the first rubber particles are crystalline, the first rubber has to have a crystalline melting point of 250° C. or more.

The reason is that in a nail penetration test, which serves as an evaluation regarding an internal short circuit, the temperature at the time of an internal short circuit exceeds several hundred ° C., depending upon the conditions. In such a high temperature, the first rubber having a decomposition temperature below 250° C., or the first rubber having a crystalline melting point of below 250° C. is burned out or excessively softened, to deform the porous film. The deformation of the porous film causes abnormal overheating.

It is desirable that the inorganic filler included in the porous film has a heat resistance equal to or higher than that of the first binder, is stable electrochemically under the environment of the lithium ion secondary battery in operation, and is suitable for making it into a paste (paint).

The BET specific surface area of the filler has to be 0.9 $m^2/g$ or more, preferably 1.5 $m^2/g$ or more, in view of making the impregnation of electrolyte into the electrode plate group easier, while improving battery performance and life. When the BET specific surface area is below 0.9 $m^2/g$, the adhesion between the first binder and the filler deteriorates to weaken the strength of the porous film, and especially in manufacturing a wound-type electrode plate group, causing a defective product. Additionally, it is preferable that the BET specific surface area is not too large, and is 150 $m^2/g$ or below, in view of suppressing coagulation of the filler and optimizing fluidity of the raw material paste for porous film.

It is preferable that the specific gravity of the inorganic filler is 0.3 to 5 $g/cm^3$ in view of shortening the kneading time of the raw material paste for porous film. Further, it is preferable that the average particle size (volume-based $D_{50}$) of the filler is 0.1 to 5 μm, and further preferably 0.2 to 2 μm. When the average particle size is too large, a thin (for example, a thickness of about 20 μm), uniform porous film is difficult to be formed: When the average particle size is too small, the necessary amount of the resin material increases with the increase in the surface are of the filler, thereby making it difficult to form sufficient gaps in the porous film.

Also, in view of controlling the filled-in state of the filler, it is preferable that the filler comprises a mixture of a large particle group and a small particle group. It is preferable that the average particle size A (volume-based $D_{50}$) of the large particle group is 0.2 to 2 μm. Additionally, the average particle size B (volume-based $D_{50}$) of the small particle group is 0.01 to 0.5 μm.

It is preferable that the average particle size A of the large particle group and the average particle size B of the small particle group satisfy the formula (1):

$$0.05 \leq B/A \leq 0.25.$$

When the value of B/A is below 0.05, the surface area of the filler increases, which necessitates a great amount of the first binder in order to obtain a porous film with sufficient strength. Also, when the value of B/A is over 0.25, the gaps formed in the filler become excessively large, failing to obtain capillary effect sufficiently, further decreasing the rate characteristic.

It is preferable that the content of the small particle group in the filler as a whole is 1 to 20 wt %, and that the rest is the large particle group. When the content of the small particle group is too small, it becomes difficult to fill the filler in the state close to the closest packing: When the content of the small particle group is too large, the surface area of the filler increases, necessitating a large amount of the first binder in order to obtain the porous film with sufficient strength.

For the above inorganic filler, inorganic oxides such as silicon oxide, alumina ($Al_2O_3$), and titanium oxide are preferable. Especially, alumina and titanium oxide are preferable. Also, among alumina, α-alumina is suitable especially, and among titanium oxide, anatase-type is preferable, rather than rutile-type. The surface of the anatase-type titanium oxide has an alkaline site, which makes a bond with an acidic group included in the first binder to stabilize the structure of the porous film. With the use of anatase-type titanium oxide, a porous film with excellent shape-retention, adhesion, electrolyte-resistance, and potential-resistance can be obtained. Although various resin fine particles are also common as a filler, the resin fine particles are low in heat resistance, and also poor in electrochemical stability compared with inorganic oxides.

The inorganic oxide can be used alone, or can be used in combination of two or more. However, the content of the alumina or of the titanium oxide in the filler as a whole is preferably 50 wt % or more. A plurality of porous films including different kinds of fillers may be laminated as well.

The following can be mentioned as the reasons why alumina is preferably used.

(1) The median diameter of alumina is suitable for forming the microporous structure (median diameter 0.02 to 0.09 μm) required for the porous film.

(2) Alumina is stable for both potentials of oxidation and reduction (0 to 5 V/vs Li).

(3) Alumina has less asperities in its particle surface (has a small surface area), and a porous film with a higher strength can be easily obtained by a small amount of binder usage.

It is preferable that gaps in the porous film have the pore size of 0.1 μm (100 nm) or below, and further preferably 0.02 to 0.07 μm (20 to 70 nm), since when the pore size or distribution of the gaps in the porous film is not uniform, lithium dendrite easily grows to deteriorate battery reliability. Also, it is desirable that such gaps are distributed uniformly.

In view of making the pore size or distribution of gaps in the porous film uniform, it is desirable that titanium oxide with relatively small particle size is used. To be specific, the particle size of titanium oxide is preferably 0.1 μm or below. Also, it is preferable that the average particle size (median diameter) based on the number of titanium oxide is 0.04 to 0.1 μm.

When ilmenite is used as a raw material of titanium oxide, ilmenite is dissolved by sulfuric acid in a reaction vessel, and then a step of sedimentation is carried out for separating the dissolved matter. The particle size of titanium oxide can be controlled by the reaction time at this time.

Among the first binders, many are oxidized or reduced in a battery to produce an acidic group. Particularly, rubber particles easily carry the acidic group. In the lithium ion secondary battery, battery performance deteriorates when the acidic group captures lithium ion. Therefore, it is preferable that the acidic group in the first binder is decreased as much as possible, by bonding the acidic group of the first binder with the filler surface.

On the other hand, some fillers are alkaline on a surface thereof. When the filler has an alkaline site on the surface thereof, the bonding strength between the acidic group of the first binder and the surface of the filler is heightened. The alkaline site is formed from cations such as aluminum ion. The filler surface preferably has a pH of over 7 and not larger than 12.

The porous film can be obtained in a state such that it is adhered to an electrode surface, by a step of applying a paste including the raw material of the porous film (hereinafter referred to as raw material paste) on the electrode surface. In the lithium ion secondary battery, the width of the negative electrode must be designed to become wider than the width of the positive electrode, in order to prevent a concentration of an electric current to an edge of the negative electrode. Therefore, in terms of fail-safe, the raw material paste should be applied on a surface of at least a negative electrode having a larger width.

The raw material paste for porous film is prepared by dispersing the filler and the first binder in a liquid component. For the liquid component, N-methyl-2-pyrrolidone, acetone, or lower alcohol can be used, and non-aqueous electrolyte can be used as well.

The content of the raw material (a total of the filler and the first binder) in the raw material paste for the porous film is preferably 25 to 70 wt %. When the raw material content is too small, the porous film with a desired thickness and strength is difficult to be obtained, and when the raw material content is too large, the viscosity of the paste becomes higher to make the application difficult.

Although the thickness of the porous film is not particularly limited, the thickness is preferably 0.5 to 20 μm, in view of making full use of the safety improvement function by the porous film, while maintaining the designed capacity of the battery. Also, when a sheet separator generally used currently is used in combination with the porous film, the total thickness of the sheet separator and the porous film can be controlled to become 15 to 30 μm.

The usage of titanium oxide having a small particle size for the filler is advantageous for making the porous film thin, since the pore size of the gaps in the porous film can be controlled to become small. That is, by using titanium oxide having the small particle size, the spatial share of electrodes in a battery-can may be larger to increase the capacity, since a certain level of performance can be obtained even when the thickness of the porous film is thinner.

The positive electrode and the negative electrode capable of absorbing and desorbing lithium ion usually comprise an electrode core material and an electrode material mixture carried thereon. The electrode material mixture includes at least an active material and a binder, and includes a conductive agent as necessary. The electrode plate is generally prepared by applying a mixture of the electrode material mixture and a dispersion medium (material mixture paste) to the electrode core material, drying the mixture, and then rolling.

In the present invention, by controlling the surface roughness of the porous film, a higher production yield can be achieved. In particular, by controlling the surface roughness of the porous film to become smaller than the surface roughness of the electrode surface where the porous film is adhered, the yield can be improved. This is because the porous film causes a decrease of the friction on the material mixture layer surface, the friction causing the separation of the material mixture. In view of avoiding the separation of the material mixture effectively, it is desirable that the average surface roughness of the porous film Ra measured by a commercially available surface roughness measurement instrument is below 2.1 μm, and further desirably below 1.5 μm.

For the particular method to form, on the material mixture layer, the porous film having a smaller surface roughness than that of the material mixture layer, methods of applying the raw material paste for porous film on the material mixture layer such as die coating method or gravure printing are easy. Also, a method of immersing the electrode plate in the raw material paste such as a batch style or successive style dip method, can be adopted. Further, a method of spraying the raw material paste on the material mixture layer such as spray emitting method can also be adopted. In any of these methods, an optimal viscosity of the raw material paste should be determined from the relationship between the target thickness of the porous film and the asperities of the surface of the electrode plate as the base.

A cross-sectional photo by scanning electron microscope (SEM) of an example of a negative electrode plate of the present invention is shown in FIG. 7. The upper part and the bottom part of FIG. 7 are almost symmetrical, and an area in the center shown by a near-white color is a negative electrode core material. The areas shown by a near-black color on both sides of the negative electrode core material are the negative electrode material mixture layers, respectively. On the outside of each negative electrode material mixture layer, porous films are formed. Additionally, a cross-sectional photo by SEM including an interface between the porous film and the negative electrode material mixture layer is shown in FIG. 8. In the negative electrode material mixture layer as the base (the bottom part of the FIG.), only a flake graphite is used as an active material. From these FIG.s, it is clear that by optimizing the viscosity of the raw material paste for porous film, the raw material paste can enter into minute asperities of the negative electrode to smooth out the electrode surface.

Generally, a negative electrode includes a negative electrode active material, a binder (a second binder), and a water-soluble polymer.

For the negative electrode active material, various natural graphites, various artificial graphites, silicon-containing composite materials such as silicide, and various alloy materials can be used.

When controlling the surface roughness of the porous film, a vapor grown carbon fiber (VGCF) which is especially highly conductive among negative electrode active materials can be used in a larger amount than conventionally. This is because although the VGCF causes many asperities on the material mixture layer surface, such asperities are to be covered by the porous film to avoid the problems such as the separation of the material mixture.

A short circuit due to deposits of metallic lithium in the porous film appears to occur mainly when lithium acceptability of the negative electrode is inferior to lithium permeability of the porous film. Lithium acceptability of negative electrode decreases as the amount of the second binder increases, to raise possibility of the short circuit occurrence.

Therefore, in the present invention, it is desirable that the decrease of lithium ion acceptability of negative electrode is suppressed to the minimum by using the second binder which can exert sufficient binding effect with a small amount of usage. In order for that, it is effective to use rubber particles (second rubber particles) in combination with a water-soluble polymer as a second binder.

For the second rubber particles, rubber particles including a styrene unit and a butadiene unit are preferable. For example, styrene-butadiene copolymer (SBR), and modified SBR can be used, although not limited thereto.

For the water-soluble polymer, cellulose resins are preferable, and those including a methylcellulose unit is particularly preferable. For example, carboxymethyl cellulose (CMC), methylcellulose, and metal salts thereof are used preferably. Among these, CMC partly converted into alkali metal salt is the most preferable.

The amount of the second binder and the amount of the water-soluble polymer included in the negative electrode are preferably 0.1 to 5 parts by weight and 0.1 to 5 parts by weight, respectively, per 100 parts by weight of the negative electrode active material.

In order to keep lithium acceptability of the negative electrode at a higher level, it is desirable that the total amount of the second rubber particles and the water-soluble polymer included in the negative electrode is 1.5 to 3 parts by weight per 100 parts by weight of the negative electrode active material. When the total amount of these is below 1.5 parts by weight per 100 parts by weight of the negative electrode active material, destruction of the structure of the negative electrode may occur (material mixture peelings), and when over 3 parts by weight per 100 parts by weight of the negative electrode active material, lithium acceptability of the negative electrode may become insufficient, which may make it difficult to prevent a short-term occurrence of short circuit.

It is preferable that the average particle size of the second rubber particles is 0.1 to 1 μm, in view of securing binding effect, while avoiding excessive coverage of the active material thereby.

It is preferable that weight ratio of the second rubber particles and the water-soluble polymer is 1:10 to 10:1. When the ratio of the water-soluble polymer relative to the rubber particles is too large, due to poor flexibility of the water-soluble polymer, the flexibility of the electrode plate deteriorates, making the material mixture prone to peel at the time of forming the electrode plate group. On the other hand, when the ratio of the second rubber particle relative to the water-soluble polymer is too large, stability of the negative electrode material mixture paste prepared in the production process of the electrode plate declines, to cause variations in the applied amounts of the paste on the electrode core material, and to decrease productivity.

Generally, the positive electrode includes at least a positive electrode active material, a positive electrode binder, and a conductive agent.

For the positive electrode active material, a composite oxide can be mentioned. For the composite oxide, lithium cobaltate, modified lithium cobaltate, lithium nickelate, modified lithium nickelate, lithium manganate, modified lithium manganate are preferable. Each modified product may include elements such as aluminum, magnesium, or the like. Also, some include at least two selected from cobalt, nickel, and manganese.

For the positive electrode binder, although not particularly limited, polytetrafluoroethylene (PTFE), modified acrylonitrile rubber particles (BM-500B manufactured by Zeon Corporation), and polyvinylidene fluoride (PVDF) can be used. It is preferable that PTFE and BM-500B are used in combination with CMC, polyethylene oxide (PEO), or modified acrylonitrile rubber (BM-720H manufactured by Zeon Corporation), which serves as a thickener for the raw material paste for positive electrode material mixture layer. PVDF alone functions as both of a binder and a thickener.

For the conductive agent, acetylene black, Ketjen black, and various graphites can be used. These can be used alone, or used in combination of two or more.

A non-aqueous electrolyte generally comprises a lithium salt and a non-aqueous solvent. For the lithium salt, $LiPF_6$ or $LiBF_4$ is used, for example. For the non-aqueous solvent, ethylene carbonate (EC), propylene carbonate (PC), dimethyl carbonate (DMC), diethyl carbonate (DEC), methyl ethyl carbonate (MEC), γ-butyrolactone, and derivatives thereof can be mentioned, although not to be limited thereto. Although one kind of non-aqueous solvent can be used alone, a combination of two or more non-aqueous solvents is preferable.

Vinylene carbonate (VC), cyclohexylbenzene (CHB), and modified VC or CHB can be used, in order to form an excellent film on the positive electrode and/or the negative electrode for securing stability at the time of overcharge.

A positive electrode capable of absorbing and desorbing lithium ion, negative electrode capable of absorbing and desorbing lithium ion, and non-aqueous electrolyte can be appropriately selected from known materials for usage, and are not limited to the above listed ones.

In the present invention, by using a porous film excellent in heat resistance and a conventional sheet separator, safety can be achieved at a higher level. Although the sheet separator is not particularly limited as long as the sheet separator comprises a material endurable to the usage environment of the lithium ion battery, generally, microporous film comprising an olefin resin such as polyethylene or polypropylene is used. The microporous film can be a single layer film comprising one kind of olefin resin, or can be a plural layer film comprising two or more olefin resins.

Although the thickness of the sheet separator is not particularly limited, in view of maintaining the designed capacity of the battery, the thickness is preferably 8 to 30 μm.

In the following, the present invention is concretely described based on Examples.

First, the method of physical property evaluation for the filler and the first binder forming the porous film used in Examples is described.

[1] pH of Filler

For pH measurement, a boiling extraction glass electrode measurement method was used, and the measurement was carried out based on JIS R6129-1976 and JIS28802-1984. Also, pH measurement using ELS-8000 (pH titration apparatus) manufactured by Otsuka Electronics Co., Ltd. was carried out.

[2] BET Specific Surface Area of Filler

The measurement of the BET specific surface area was carried out by using a direct-reading specific surface area measurement apparatus, based on BET single point method. First, 0.5 to 1 g of insulating filler as a sample was placed in a glass cell, and cleaning was carried out for 20 to 30 minutes at 250° C. under a flow of a mixed carrier gas of nitrogen and helium (volume ratio $N_2$:He=30:70). Then, while cooling the sample of the insulating filler with liquid nitrogen, $N_2$ in the carrier gas was adsorbed thereon. Subsequently, the temperature of the sample of the insulating filler was raised to give room temperature. The desorbed amount of $N_2$ was detected by a thermal conductive detector, and the specific surface area was calculated from the surface area corresponding to the desorbed amount of $N_2$ and a mass of the sample after the measurement. For the calculation, NOVA2000 manufactured by Yuasa Ionics Inc. was used.

[3] Heat Resistance of Filler

Differential scanning calorimetry (DSC) and thermogravimetry-differential thermal analysis (TG-DTA) were carried out for the sample of the filler, to evaluate heat resistance based on the temperature of an inflection point in the DSC measurement or the temperature at the start point of the weight change in the TG-DTA measurement.

[4] Crystalline Melting Point or Decomposition Temperature of Binder

Differential scanning calorimetry (DSC) and thermogravimetry-differential thermal analysis (TG-DTA) of the binder sample were carried out, and the temperature of the inflection point in the DSC measurement or the temperature at the start point of the weight change in the TG-DTA measurement was regarded as the crystalline melting point or the decomposition temperature.

[5] Affinity between First Binder and Water

Solubility of the first binder in water at room temperature and atmospheric pressure was measured, and it was determined as "water-insoluble" when the solubility is 1 wt % or below.

[6] Particle Size Distribution and Median Diameter of Filler

The measurement of the average particle size was carried out by using a laser diffraction scattering particle size distribution analyzer (Master Sizet 2000 manufactured by Malvern Instruments Ltd.) and a centrifugal particle size distribution analyzer (SA-CP3 manufactured by Shimadzu Corporation).

Example 1

Figure 2:
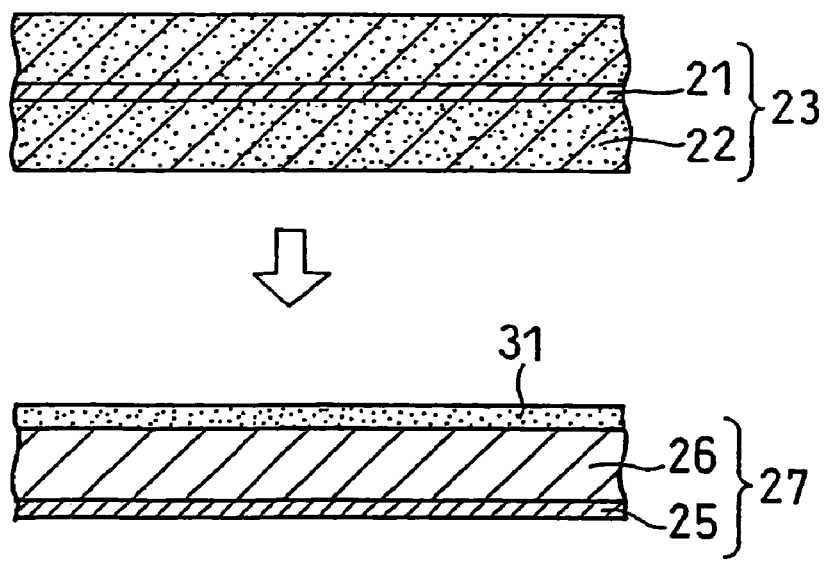
FIG. 2 is a view schematically showing an example of electrode arrangement in which a porous film of the present invention is adhered to the electrode.
Figure 3:
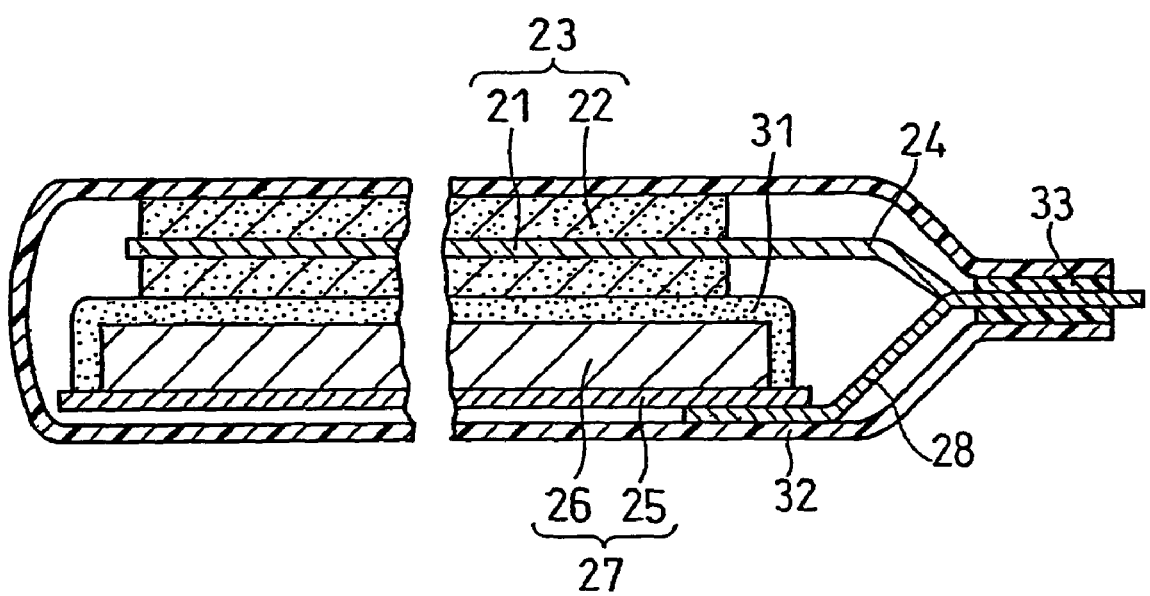
FIG. 3 is a vertical cross sectional view of an example of a lithium ion secondary battery of the present invention.
Figure 4:
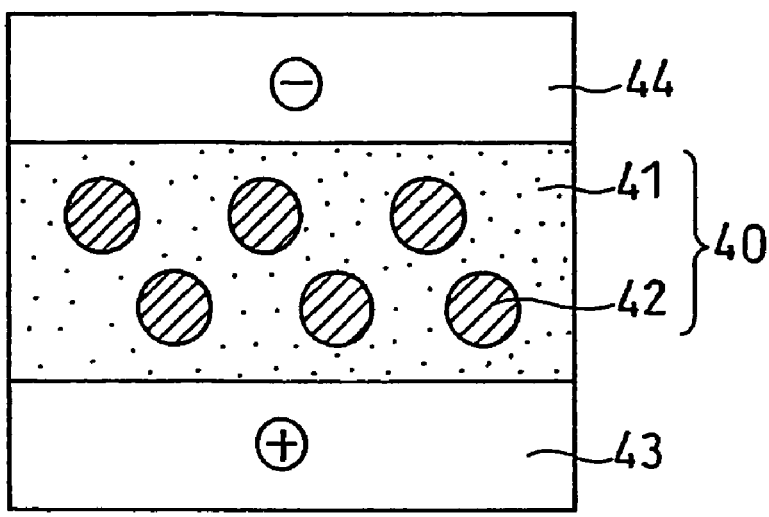
FIG. 4 is a schematic view showing a structure of a conventional porous film.
Figure 5:
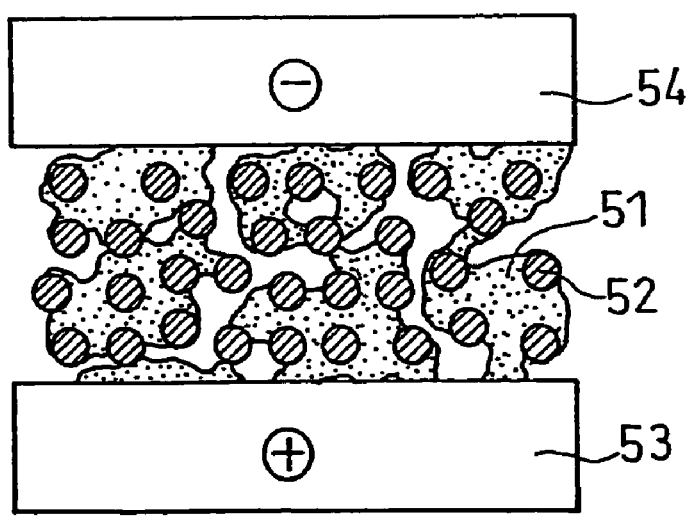
FIG. 5 is a schematic view showing a structure of another conventional porous film.

FIG. 2 and FIG. 3 are referred to in the following explanation.

(a) Preparation of Raw Material Paste of Porous Film

A raw material paste for a porous film was prepared by dispersing a filler and a first binder in N-methyl-2-pyrrolidone (NMP) in the ratios shown in Table 1, and then kneading them. The total content of the filler and the first binder in the paste was set as 50 wt % in any of the case.

For the first binder, core-shell type rubber particles including an acrylonitrile unit (a first rubber) and polyvinylidene fluoride (PVDF) with a molecular weight of 350,000 were used in combination.

Herein, for the core-shell type rubber particles, BM500B (average particle size 0.2 μm) manufactured by Zeon Corporation, comprising acrylonitrile-acrylate copolymer was used.

Physical properties of BM500B are shown in the following.

Figure 6:
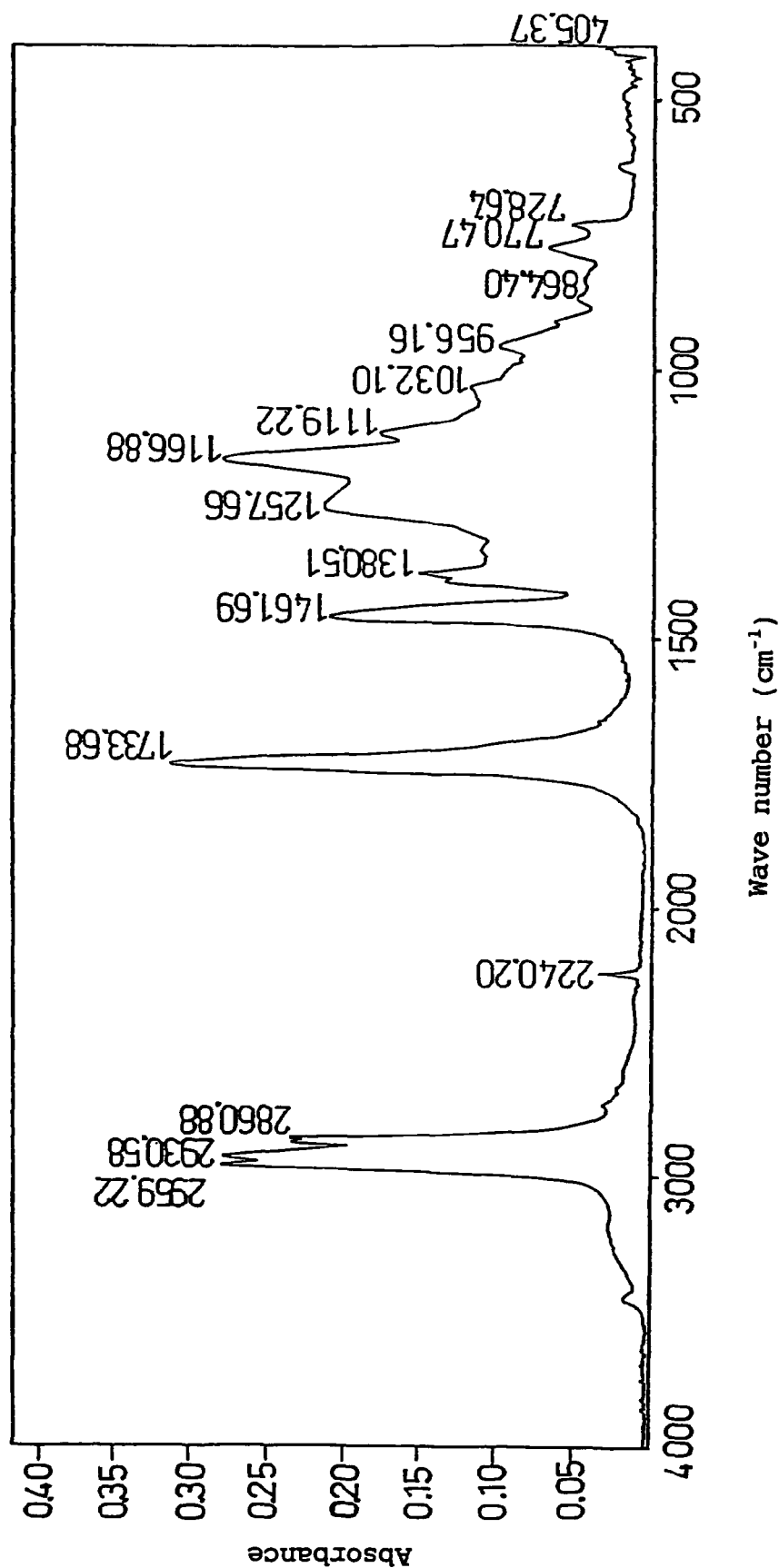
FIG. 6 is an example of the FT-IR absorption spectrum of an example of a first rubber including an acrylonitrile unit (core-shell type particles).

<1> Crystalline Melting Point: None (amorphous)
<2> Decomposition Temperature: 308.5° C.
<3> Affinity With Water: Water-Insoluble The absorption spectrum of the first rubber (BM500B) obtained by an FT-IR measurement is shown in FIG. 6. For the measurement apparatus, FT-IR microscope (Continuμm manufactured by Nicolet Instrument Corporation, light source: AVATAR-360) was used.

The measurement conditions were set as: sample scan 32, background scan 32, resolution 4000, and sample gain 1.0. For the measurement sample, the first rubber was dispersed in N-methyl-2-pyrrolidon, applied on a KBr plate, and dried for the usage.

In FIG. 6, the absorption peak observed near 2240 $cm^{-1}$ is based on C≡N stretching vibration of acrylonitrile, and absorption peak near 1733 $cm^{-1}$ is based on C=O stretching vibration. In FIG. 6, the absorption peak intensity (peak height) based on C=O stretching vibration is about 10 times the absorption peak intensity (peak height) based on C≡N stretching vibration of acrylonitrile unit.

For the filler, $Al_2O_3$ was used. Herein, "alumina a" with the average particle size of 0.2 to 2 μm was used alone, or a mixture of "alumina a" with the average particle size of 0.4 μm and "alumina b" with the average particle size of 0.01 to 0.15 μm was used. The "alumina a" content and the "alumina b" content in the mixture were set as 90 wt % and 10 wt %, respectively. When the particle size distribution of the alumina mixture was measured, peaks of particle size were observed at 0.35 μm and at 0.2 μm or below, respectively.

(b) Fabrication of Positive Electrode

To 100 parts by weight of $LiCoO_2$, 4 parts by weight of polyvinylidene fluoride (PVDF) as a binder and 3 parts by weight of acetylene black as a conductive agent were added and subsequently an appropriate amount of N-methyl-2-pyrrolidone (NMP) was added and then kneaded, to prepare a positive electrode material mixture paste. The obtained positive electrode material mixture paste was applied on both sides of an aluminum foil core material 21 with a thickness of 20 μm, and then rolled so that the density of the active material (density of $LiCoO_2$) in a positive electrode material mixture 22 became 3.3 g/ml, to produce a positive electrode 23. A positive electrode lead 24 made of aluminum was connected to the positive electrode 23.

(c) Fabrication of Negative Electrode

To 100 parts by weight of spherical artificial graphite, as a second binder, rubber particles comprising a copolymer including a styrene unit and a butadiene unit, and carboxymethyl cellulose (CMC) were added in the ratios shown in Table 1. An appropriate amount of water was added thereto and then kneaded, to prepare a negative electrode material mixture paste.

Herein, for the rubber particles comprising a copolymer including a styrene unit and a butadiene unit, BM400B (average particle size 0.4 μm) manufactured by ZEON Corporation, comprising a styrene-methacrylic acid-butadiene copolymer, was used.

The obtained negative electrode material mixture paste was applied onto one side of a copper foil core material 25 with a thickness of 15 μm, and then rolled so that the density of the active material (density of graphite) in the negative electrode material mixture 26 became 1.4 g/ml, to produce a negative electrode 27. To the negative electrode 27, a negative electrode lead 28 made of copper was connected.

(d) Formation of Porous Film

Then, the raw material paste for porous film was applied to give a thickness of 20 μm on one side of the negative electrode 27 so that the negative electrode material mixture 26 was completely covered therewith, to form a porous film 31.

(e) Preparation of Electrolyte

For the non-aqueous electrolyte, to a mixed solvent of ethylene carbonate, ethylmethyl carbonate, and dimethyl carbonate with a volume ratio of 1:1:1, lithium hexafluorophosphate ($LiPF_6$) was dissolved to give a concentration of 1 mol/L. Also, to the mixed solvent, 4% by volume of vinylene carbonate was added.

(f) Fabrication of Battery

As shown in FIG. 2, the positive electrode 23 was disposed on the porous film 31 to form a stacked-type unit cell comprising a pair of positive electrode and negative electrode. This unit cell was enveloped by an outer jacket 32 comprising aluminum laminate sheet, and then, a non-aqueous electrolyte was charged into the outer jacket.

Then, resin sealing materials 33 covering a part of the positive electrode lead 24 and the negative electrode lead 28 are aligned to be located at an opening end of the outer jacket 32, respectively, and the outer jacket 32 was sealed under vacuum while free ends of the respective lead were drawn to the outside. A lithium ion secondary battery with a theoretical capacity of 600 mAh as shown in FIG. 3 was thus completed.

TABLE 1

| Example | Amount of Second Binder/100 parts by weight of Active Material (parts by weight) BM400B | CMC | Amount of First Binder/100 parts by weight of Filler (parts by weight) BM500B | PVDF | Average Particle Size of Filler (μm) Alumina a | Alumina b | Peeling of Negative Electrode | Peeling of Porous Film | Short Circuit | High-rate Characteristic (%) |
|---|---|---|---|---|---|---|---|---|---|---|
| X1 | 1 | 1 | 2 | 2 | 0.4 | — | Absent | Absent | Absent | 86.3 |
| X2 | 0.75 | 0.75 | 2 | 2 | 0.4 | — | Absent | Absent | Absent | 88.1 |
| Y1 | 0.5 | 0.5 | 2 | 2 | 0.4 | — | Present | — | — | — |
| X3 | 1.5 | 1.5 | 2 | 2 | 0.4 | — | Absent | Absent | Absent | 84.9 |
| Y2 | 2 | 2 | 2 | 2 | 0.4 | — | Absent | Absent | Present | — |
| X4 | 1 | 1 | 0.75 | 0.75 | 0.4 | — | Absent | Absent | Absent | 89.9 |
| Y3 | 1 | 1 | 0.5 | 0.5 | 0.4 | — | Absent | Present | — | — |
| X5 | 1 | 1 | 3 | 3 | 0.4 | — | Absent | Absent | Absent | 84.1 |
| X6 | 1 | 1 | 4 | 4 | 0.4 | — | Absent | Absent | Absent | 80.5 |
| Y4 | 1 | 1 | 5 | 5 | 0.4 | — | Absent | Absent | Absent | 73.8 |
| X7 | 1 | 1 | 2 | 2 | 0.4 | 0.05(B/A = 0.125) | Absent | Absent | Absent | 87.5 |
| X8 | 1 | 1 | 2 | 2 | 0.4 | 0.02(B/A = 0.05) | Absent | Absent | Absent | 89.1 |
| X9 | 1 | 1 | 2 | 2 | 0.4 | 0.01(B/A = 0.025) | Absent | Slightly | Absent | 89.3 |
| X10 | 1 | 1 | 2 | 2 | 0.4 | 0.1(B/A = 0.25) | Absent | Absent | Absent | 85.9 |
| X11 | 1 | 1 | 2 | 2 | 0.4 | 0.15(B/A = 0.375) | Absent | Absent | Absent | 84.8 |
| X12 | 1 | 1 | 0.8 | 3.2 | 0.4 | — | Absent | Slightly | Absent | 86.2 |
| X13 | 1 | 1 | 3.2 | 0.8 | 0.4 | — | Absent | Absent | Absent | 86.8 |
| X14 | 1 | 1 | 2 | 2 | 0.2 | — | Absent | Slightly | Absent | 88.1 |
| X15 | 1 | 1 | 2 | 2 | 1 | — | Absent | Absent | Absent | 86.2 |
| X16 | 1 | 1 | 2 | 2 | 2 | — | Absent | Absent | Absent | 85.7 |
| X17 | 0.4 | 1.6 | 2 | 2 | 0.4 | — | Slightly | Absent | Absent | 88.6 |
| X18 | 1.6 | 0.4 | 2 | 2 | 0.4 | — | Absent | Absent | Absent | 84.9 |

(Evaluation)

Evaluations were carried out for the porous film prepared in the above and the completed lithium ion secondary battery, as in the following.

[Presence or Absence of Peelings]

Appearances of the negative electrode and the porous film were observed to check if peelings occurred.

[Occurrence of Short Circuit]

Each battery was charged at 120 mA till the battery voltage reached 4.2 V, and the charged battery was left at the atmosphere of 45° C. for a week. The battery voltage was measured afterwards, and it was determined that a short circuit occurred when the voltage was below 4.0 V. The results are shown in Table 1.

[High-Rate Characteristic]

After activating each battery by carrying out a predetermined charge and discharge, the batteries were charged at 120 mA till the battery voltage reached 4.2 V, and then discharged at 60 mA till the battery voltage reached 3 V. Then, the same charging was carried out and discharging was carried out at 600 mA till the battery voltage reached 3 V. Then, the ratio of discharge capacity when discharging at 600 mA relative to the discharge capacity when discharging at 60 mA was obtained by percentage. The results are shown in Table 1.

(Results Consideration)

The results of Table 1 shows that the porous film with sufficient strength cannot be obtained when the amount of the first binder in the porous film is small, due to the occurrence of peelings of porous film. Also, it is shown that high-rate characteristic greatly declines when the amount of the first binder is too large. That is, the results of Table 1 imply that the content of the first binder in the porous film should be 1.5 to 8 parts by weight per 100 parts by weight of the filler.

On the other hand, it is shown that the negative electrode with sufficient strength cannot be obtained when the amount of the second binder in the negative electrode is small due to the occurrence of the peelings of the negative electrode material mixture. Also, when the amount of the second binder is too large, a short circuit tends to occur due to the decline in lithium acceptability of the negative electrode. When the battery in which the short circuit occurred was disassembled to observe the cross section of the porous film, deposits of metallic lithium were seen in the porous film. Therefore, it can be seen that the amount of the second binder in the negative electrode should be 1.5 to 3 parts by weight per 100 parts by weight of the negative electrode active material.

It can be also seen that high-rate characteristic tends to gradually decline as the ratio (value B/A) of the average particle size of "alumina b" and "alumina a" increases. On the other hand, it can be seen that when the value B/A is too small, the strength of the porous film tends to decrease.

When the average particle size of the filler is too small, the surface area thereof becomes too large to cause insufficient first binder, showing a tendency to cause peelings of the porous film. On the other hand, when the filler is too large, the first binder becomes a surplus, showing a decline in high-rate characteristic.

Example 2

Battery A1

(a) Preparation of Raw Material Paste of Porous Film

A raw material paste for porous film was prepared by kneading 970 g of alumina with a median diameter of 0.3 μm as a filler, 375 g of BM-720H (NMP solution containing 8 wt % of a first rubber including a polyacrylonitrile chain as a first binder) manufactured by ZEON Corporation, and an appropriate amount of NMP in a double-arm kneader.

Physical properties of BM-720H are shown below.
<1> Crystalline Melting Point: None (amorphous)
<2> Decomposition Temperature: 320° C.
<3> Affinity With Water: Water-Insoluble (b) Fabrication of Positive Electrode A positive electrode material mixture paste was prepared by mixing 3 kg of lithium cobaltate, 1 kg of PVDF#1320 (NMP solution containing 12 wt % of PVDF) manufactured by Kureha Chemical Industry Co., Ltd. as a binder, 90 g of acetylene black, and an appropriate amount of NMP, with a double-arm kneader. This paste was applied on an aluminum foil with a thickness of 15 μm, and rolled after drying, to form a positive electrode material mixture layer. At this time, the thickness of the electrode plate comprising the aluminum foil and the material mixture layers was set as 160 μm. Afterwards, the electrode plate was slit to give a width which could be inserted into a can battery case of a cylindrical battery (product number 18650) to obtain a positive electrode hoop.

(c) Fabrication of Negative Electrode

A negative electrode material mixture paste was prepared by mixing 3 kg of artificial graphite, 75 g of BM-400B (aqueous dispersion including 40 wt % of styrene-butadiene copolymer (second rubber particle) as a second binder) manufactured by ZEON Corporation, 30 g of CMC as a water-soluble polymer, and an appropriate amount of water with a double-arm kneader. This paste was applied on a copper foil with a thickness of 10 μm, and rolled after drying, to form a negative electrode material mixture layer. At this time, the thickness of the electrode plate comprising the copper foil and the material mixture layers was set as 180 μm. Afterwards, the electrode plate was slit to give a width which could be inserted into the can battery case of the cylindrical battery (product number 18650), to obtain a negative electrode hoop.

(d) Formation of Porous Film

The raw material paste for porous film was applied on both sides of the positive electrode hoop, and then dried, to form a porous film having a thickness of 5 μm per side adhered to the positive electrode surface.

(e) Preparation of Electrolyte

For the non-aqueous electrolyte, a solvent mixture in which ethylene carbonate, ethyl methyl carbonate, and dimethyl carbonate were mixed with a volume ratio of 1:1:1, dissolving lithium hexafluorophosphate ($LiPF_6$) to give a concentration of 1 mol/liter was used. Also, 3% by volume of vinylene carbonate relative to the solvent mixture was added to the non-aqueous electrolyte.

(f) Fabrication of Battery

The above positive electrode and negative electrode were cut to give a predetermined length, respectively, and were wound interposing a sheet separator with a thickness of 20 μm comprising a microporous film made of polyethylene, and then were inserted into the battery case. Then, 5.5 g of the above electrolyte was weighed and injected into the battery case, and the opening of the case was sealed. A cylindrical-shape 18650 lithium ion secondary battery A1 was thus made.

Battery B1

A battery B1 was made in the same manner as the battery A1, except that the porous film was not formed on both sides of the positive electrode hoop.

Battery B2

The raw material paste for porous film was applied on both sides of the sheet separator comprising a polyethylene-made microporous film, and then dried, to form a porous film having a thickness of 5 μm per side adhered to the separator surface. A battery B2 was made in the same manner as the battery B1, except that the separator having the porous film thus obtained was used.

Battery B3

The raw material paste for porous film was applied on both sides of the negative electrode hoop, and then dried, to form a porous film having a thickness of 0.3 μm per side adhered to the negative electrode surface. A battery B3 was made in the same manner as the battery B1, except that the negative electrode having the porous film thus obtained was used.

Battery A2

The raw material paste for porous film was applied on both sides of the negative electrode hoop, and then dried, to form a porous film having a thickness of 0.5 μm per side adhered to the negative electrode surface. A battery A2 was made in the same manner as the battery B1, except that the negative electrode having the porous film thus obtained was used.

Battery A3

The raw material paste for porous film was applied on both sides of the negative electrode hoop, and then dried, to form a porous film having a thickness of 1 μm per side adhered to the negative electrode surface. A battery A3 was made in the same manner as the battery B1, except that the negative electrode having the porous film thus obtained was used.

Battery A4

The raw material paste for porous film was applied on both sides of the negative electrode hoop, and then dried, to form a porous film having a thickness of 5 μm per side adhered to the negative electrode surface. A battery A4 was made in the same manner as the battery B1, except that the negative electrode having the porous film thus obtained was used.

Battery A5

The raw material paste for porous film was applied on both sides of the negative electrode hoop, and then dried, to form a porous film having a thickness of 10 μm per side adhered to the negative electrode surface. A battery A5 was made in the same manner as the battery B1, except that the negative electrode having the porous film thus obtained was used.

Battery A6

The raw material paste for porous film was applied on both sides of the negative electrode hoop, and then dried, to form a porous film having a thickness of 15 μm per side adhered to the negative electrode surface. A battery A6 was made in the same manner as the battery B1, except that the negative electrode having the porous film thus obtained was used.

Battery A7

The raw material paste for porous film was applied on both sides of the negative electrode hoop, and then dried, to form a porous film having a thickness of 20 μm per side adhered to the negative electrode surface. A battery A7 was made in the same manner as the battery B1, except that the negative electrode having the porous film thus obtained was used.

Battery B4

The raw material paste for porous film was applied on both sides of the negative electrode hoop, and then dried, to form a porous film having a thickness of 30 μm per side adhered to the negative electrode surface. A battery B4 was made in the same manner as the battery B1, except that the negative electrode having the porous film thus obtained was used.

Battery B5

A battery B5 in which a thickness of the porous film adhered to the negative electrode surface was 5 μm per side thereof was made in the same manner as the battery A4, except that the thickness of the sheet separator was set as 6 μm.

Battery A8

A battery A8 in which a thickness of the porous film adhered to the negative electrode surface was 5 μm per side thereof was made in the same manner as the battery A4, except that the thickness of the sheet separator was set as 8 μm.

Battery A9

A battery A9 in which a thickness of the porous film adhered to the negative electrode surface was 5 μm per side thereof was made in the same manner as the battery A4, except that the thickness of the sheet separator was set as 10 μm.

Battery A10

A battery A10 in which a thickness of the porous film adhered to the negative electrode surface was 5 μm per side thereof was made in the same manner as the battery A4, except that the thickness of the sheet separator was set as 15 μm.

Battery A11

A battery A11 in which a thickness of the porous film adhered to the negative electrode surface was 5 μm per side thereof was made in the same manner as the battery A4, except that the thickness of the sheet separator was set as 25 μm.

Battery A12

A battery A12 in which a thickness of the porous film adhered to the negative electrode surface was 5 μm per side thereof was made in the same manner as the battery A4, except that the thickness of the sheet separator was set as 30 μm.

Battery B6

A battery B6 in which a thickness of the porous film adhered to the negative electrode surface was 5 μm per side thereof was made in the same manner as the battery A4, except that the thickness of the sheet separator was set as 40 μm.

Battery B7

A battery B7 in which a thickness of the porous film adhered to the negative electrode surface was 5 μm per side thereof was made in the same manner as the battery A4, except that the filler content relative to the total of the filler and the first binder was set as 30 wt %.

Battery A13

A battery A13 in which a thickness of the porous film adhered to the negative electrode surface was 5 μm per side thereof was made in the same manner as the battery A4, except that the filler content relative to the total of the filler and the first binder was set as 50 wt %.

Battery A14

A battery A14 in which a thickness of the porous film adhered to the negative electrode surface was 5 μm per side thereof was made in the same manner as the battery A4, except that the filler content relative to the total of the filler and the first binder was set as 70 wt %.

Battery A15

A battery A15 in which a thickness of the porous film adhered to the negative electrode surface was 5 μm per side thereof was made in the same manner as the battery A4, except that the filler content relative to the total of the filler and the first binder was set as 90 wt %.

Battery A16

A battery A16 in which a thickness of the porous film adhered to the negative electrode surface was 5 μm per side thereof was made in the same manner as the battery A4, except that the filler content relative to the total of the filler and the first binder was set as 95 wt %.

Battery A17

A battery A17 in which a thickness of the porous film adhered to the negative electrode surface was 5 μM per side thereof was made in the same manner as the battery A4, except that the filler content relative to the total of the filler and the first binder was set as 99 wt %.

Battery B8

A battery B8 in which a thickness of the porous film adhered to the negative electrode surface was 5 μm per side thereof was made in the same manner as the battery A4, except that the filler content relative to the total of the filler and the first binder was set as 99.5 wt %.

Battery B9

A battery B9 in which a thickness of the porous film adhered to the negative electrode surface was 5 μm per side thereof was made in the same manner as the battery A4, except that as the first binder, water-soluble CMC was used instead of BM-720H to prepare the raw material paste for porous film. Since CMC was used as the first binder, in the battery B9, for the dispersion medium of the raw material paste, water was used instead of NMP. CMC does not have a crystalline melting point, is amorphous, and has a decomposition temperature of 245° C.

Battery B10

A battery B10 in which a thickness of the porous film adhered to the negative electrode surface was 5 μm per side thereof was made in the same manner as the battery A4, except that as a first binder, water-insoluble PVDF was used instead of BM-720H, to prepare the raw material paste for porous film. PVDF has a crystalline melting point and a decomposition temperature of 174° C. and 360° C., respectively.

Battery B11

A battery B11 in which a thickness of the porous film adhered to the negative electrode surface was 5 μm per side thereof was made in the same manner as the battery A4, except that as the filler, polyethylene beads with a median diameter of 0.3 μm were used instead of the alumina with a median diameter of 0.3 μm.

Battery A18

A battery A18 in which a thickness of the porous film adhered to the negative electrode surface was 5 μm per side thereof was made in the same manner as the battery A4, except that as the filler, titania with a median diameter of 0.3 μm was used instead of the alumina with a median diameter of 0.3 μm.

Battery A19

Upon making a negative electrode, instead of BM400B and CMC as the second binder, 8 wt % of PVDF relative to the artificial graphite was used. Herein, for PVDF, PVDF#1320 which was used as the binder of the positive electrode was used. Except for the above, a battery A19 in which a thickness of the porous film adhered to the negative electrode surface was 5 μm per side thereof was made in the same manner as the battery A4.

The configuration of the porous film is summarized and shown in Table 2. Additionally, the thickness of the sheet separator and the kinds of the second binder used for the negative electrode are summarized and shown in Table 3.

TABLE 2

| | | Porous Film | | | | | |
|---|---|---|---|---|---|---|---|
| | | | | | | Binder | |
| Battery No. | Adhered Portion | Film Thickness (μm) | Filler Kind | Content (wt %) | Kind | Crystalline Melting Point (° C.) | Decomposition Temperature (° C.) |
| A1 | Positive Electrode | 5 | Alumina | 97 | BM720H | None | 320 |
| A2 | Negative Electrode | 0.5 | Alumina | 97 | BM720H | None | 320 |
| A3 | Negative Electrode | 1 | Alumina | 97 | BM720H | None | 320 |
| A4 | Negative Electrode | 5 | Alumina | 97 | BM720H | None | 320 |
| A5 | Negative Electrode | 10 | Alumina | 97 | BM720H | None | 320 |
| A6 | Negative Electrode | 15 | Alumina | 97 | BM720H | None | 320 |
| A7 | Negative Electrode | 20 | Alumina | 97 | BM720H | None | 320 |
| A8 | Negative Electrode | 5 | Alumina | 97 | BM720H | None | 320 |
| A9 | Negative Electrode | 5 | Alumina | 97 | BM720H | None | 320 |
| A10 | Negative Electrode | 5 | Alumina | 97 | BM720H | None | 320 |
| A11 | Negative Electrode | 5 | Alumina | 97 | BM720H | None | 320 |
| A12 | Negative Electrode | 5 | Alumina | 97 | BM720H | None | 320 |
| A13 | Negative Electrode | 5 | Alumina | 50 | BM720H | None | 320 |
| A14 | Negative Electrode | 5 | Alumina | 70 | BM720H | None | 320 |
| A15 | Negative Electrode | 5 | Alumina | 90 | BM720H | None | 320 |
| A16 | Negative Electrode | 5 | Alumina | 95 | BM720H | None | 320 |

TABLE 2-continued

| | | Porous Film | | | | | |
|---|---|---|---|---|---|---|---|
| | | | | | | Binder | |
| | | Film | Filler | | | Crystalline Melting | Decomposition |
| Battery No. | Adhered Portion | Thickness (μm) | Kind | Content (wt %) | Kind | Point (° C.) | Temperature (° C.) |
| A17 | Negative Electrode | 5 | Alumina | 99 | BM720H | None | 320 |
| A18 | Negative Electrode | 5 | Titania | 97 | BM720H | None | 320 |
| A19 | Negative Electrode | 5 | Alumina | 97 | BM720H | None | 320 |
| B1 | None | — | — | — | — | — | — |
| B2 | Separator | 5 | Alumina | 97 | BM720H | None | 320 |
| B3 | Negative Electrode | 0.3 | Alumina | 97 | BM720H | None | 320 |
| B4 | Negative Electrode | 30 | Alumina | 97 | BM720H | None | 360 |
| B5 | Negative Electrode | 5 | Alumina | 97 | BM720H | None | 320 |
| B6 | Negative Electrode | 5 | Alumina | 97 | BM720H | None | 320 |
| B7 | Negative Electrode | 5 | Alumina | 30 | BM720H | None | 320 |
| B8 | Negative Electrode | 5 | Alumina | 99.5 | BM720H | None | 320 |
| B9 | Negative Electrode | 5 | Alumina | 97 | CMC | None | 245 |
| B10 | Negative Electrode | 5 | Alumina | 97 | PVDF | 174 | 360 |
| B11 | Negative Electrode | 5 | PE beads | 97 | BM720H | None | 320 |

TABLE 3

| | | | Porous Film | | |
|---|---|---|---|---|---|
| Battery No. | Separator Thickness (μm) | Negative Electrode Binder | Adhesiveness | Flexibility (No. of Defects) | Negative Electrode Appearance |
| A1 | 20 | BM400B + CMC | OK | 0 | No Change |
| A2 | 20 | BM400B + CMC | OK | 0 | No Change |
| A3 | 20 | BM400B + CMC | OK | 0 | No Change |
| A4 | 20 | BM400B + CMC | OK | 0 | No Change |
| A5 | 20 | BM400B + CMC | OK | 0 | No Change |
| A6 | 20 | BM400B + CMC | OK | 0 | No Change |
| A7 | 20 | BM400B + CMC | OK | 0 | No Change |
| A8 | 8 | BM400B + CMC | OK | 0 | No Change |
| A9 | 10 | BM400B + CMC | OK | 0 | No Change |
| A10 | 15 | BM400B + CMC | OK | 0 | No Change |
| A11 | 25 | BM400B + CMC | OK | 0 | No Change |
| A12 | 30 | BM400B + CMC | OK | 0 | No Change |
| A13 | 20 | BM400B + CMC | OK | 0 | No Change |
| A14 | 20 | BM400B + CMC | OK | 0 | No Change |
| A15 | 20 | BM400B + CMC | OK | 0 | No Change |
| A16 | 20 | BM400B + CMC | OK | 0 | No Change |
| A17 | 20 | BM400B + CMC | OK | 1 | No Change |
| A18 | 20 | BM400B + CMC | OK | 0 | No Change |
| A19 | 20 | PVDF | OK | 2 | No Change |
| B1 | 20 | BM400B + CMC | — | — | No Change |
| B2 | 20 | BM400B + CMC | OK | 0 | No Change |
| B3 | 20 | BM400B + CMC | OK | 0 | No Change |
| B4 | 20 | BM400B + CMC | OK | 1 | No Change |
| B5 | 6 | BM400B + CMC | OK | 0 | No Change |
| B6 | 40 | BM400B + CMC | OK | 0 | No Change |
| B7 | 20 | BM400B + CMC | OK | 0 | No Change |
| B8 | 20 | BM400B + CMC | NG | — | — |
| B9 | 20 | BM400B + CMC | OK | 8 | Changed |
| B10 | 20 | BM400B + CMC | OK | 5 | No Change |
| B11 | 20 | BM400B + CMC | OK | 0 | No Change |

(Evaluation)

Evaluations were carried out for the produced porous film and the lithium ion secondary battery completed in the above, as in the following. The results are shown in Tables 3 to 4.

[Adhesiveness of Porous Film]

After applying on the positive electrode, the negative electrode, or the separator and then drying, the porous film thus obtained was observed visually immediately after the formation. For those showed a trace of chips, cracks, or separation are marked as "NG", and those with good conditions are marked as "OK" in Table 3.

[Appearance of Negative Electrode]

After applying the raw material paste for porous film on the negative electrode, the paste was dried and the condition of the negative electrode immediately after the formation of the porous film was observed visually. For those showed defects such as size changes are marked as "changed" and others are marked as "no change" in Table 3.

[Flexibility of Porous Film]

Upon winding the positive electrode and the negative electrode interposing the sheet separator, the condition of the porous film formed on any one of the positive electrode, the negative electrode, and the separator were observed visually, mainly the condition near the winding core. For each battery, 10 pieces of the wound electrode plate groups were made, and the numbers of the electrode plate group in which chips, cracks, or separation occurred on the winding are shown in Table 3.

[Battery Designed Capacity]

For a diameter of 18 mm of the battery case, the diameter of the wound electrode plate groups were set as 16.5 mm focusing on easiness of insertion. In this case, the battery designed capacity was obtained from positive electrode weight, by setting the capacity per 1 g of the positive electrode active material as 142 mAh, and shown in Table 4.

[Charge and Discharge Characteristics of Battery]

For the completed batteries comprising the electrode plate groups without chips, cracks, or separation due to the winding, preliminary charge and discharge were carried out twice, and the batteries were stored for 7 days under an atmosphere of 45° C. Afterwards, under an atmosphere of 20° C., the following two patterns of charge and discharge were carried out.
(1) The First Pattern
  Constant Current Charge: 1400 mA (End Voltage 4.2 V)
  Constant Voltage Charge: 4.2 V (End Current 100 mA)
  Constant Current Discharge: 400 mA (End Voltage 3 V)
(2) The Second Pattern
  Constant Current Charge: 1400 mA (End Voltage 4.2 V)
  Constant Voltage Charge: 4.2 V (End Current 100 mA)
  Constant Current Discharge: 4000 mA (End voltage 3 V)
  The charge and discharge capacities at this time are shown in Table 4.

[Nail Penetration Safety]

For those batteries completed the evaluation of charge and discharge characteristics, the following charges were carried out at an atmosphere of 20° C.
  Constant Current Charge: 1400 mA (End Voltage 4.25 V)
  Constant Voltage Charge: 4.25 V (End Current 100 mA)

The batteries after the charging were penetrated with an iron-made round nail with a diameter of 2.7 mm under an atmosphere of 20° C. with the speed of 5 mm/second or 180 mm/second from the side face of the battery, and heat generation at the time was observed. The temperatures reached after 1 second and after 90 seconds at the penetration point of the battery are shown in Table 4.

TABLE 4

| | Battery | | | | | | | |
|---|---|---|---|---|---|---|---|---|
| | | Charge and Discharge Characteristics | | | Nail Penetration Safety | | | |
| | | | | | Nail Speed 5 mm/s | | Nail Speed 180 mm/s | |
| | Designed | | 400 mAh | 4000 mAh | Temperature Reached | | Temperature Reached | |
| Battery No. | Capacity (mAh) | Charge (mAh) | Discharge (mAh) | Discharge (mAh) | After 1 sec. (° C.) | After 90 sec. (° C.) | After 1 sec. (° C.) | After 90 sec. (° C.) |
| A1 | 1944 | 1941 | 1938 | 1819 | 72 | 91 | 70 | 88 |
| A2 | 2008 | 2010 | 2006 | 1879 | 76 | 89 | 69 | 93 |
| A3 | 2001 | 1999 | 1996 | 1881 | 71 | 92 | 74 | 94 |
| A4 | 1943 | 1941 | 1939 | 1821 | 74 | 94 | 72 | 89 |
| A5 | 1872 | 1875 | 1874 | 1759 | 68 | 88 | 76 | 90 |
| A6 | 1801 | 1799 | 1796 | 1688 | 69 | 96 | 69 | 96 |
| A7 | 1729 | 1730 | 1728 | 1622 | 77 | 90 | 70 | 91 |
| A8 | 2126 | 2124 | 2119 | 1989 | 72 | 91 | 73 | 94 |
| A9 | 2094 | 2090 | 2086 | 1962 | 70 | 97 | 74 | 87 |
| A10 | 2014 | 2016 | 2012 | 1902 | 65 | 93 | 72 | 95 |
| A11 | 1873 | 1874 | 1870 | 1760 | 74 | 96 | 71 | 90 |
| A12 | 1800 | 1797 | 1792 | 1679 | 71 | 89 | 73 | 94 |
| A13 | 1942 | 1940 | 1937 | 1784 | 66 | 88 | 69 | 91 |
| A14 | 1944 | 1939 | 1938 | 1805 | 70 | 96 | 72 | 89 |
| A15 | 1939 | 1938 | 1935 | 1819 | 70 | 94 | 68 | 89 |
| A16 | 1944 | 1942 | 1939 | 1823 | 73 | 91 | 73 | 88 |
| A17 | 1941 | 1940 | 1937 | 1819 | 69 | 88 | 74 | 92 |
| A18 | 1943 | 1942 | 1940 | 1811 | 72 | 90 | 71 | 93 |
| A19 | 1946 | 1944 | 1941 | 1799 | 70 | 93 | 69 | 90 |
| B1 | 2015 | 2014 | 2003 | 1888 | 146 | — | 138 | — |
| B2 | 1944 | 1939 | 1935 | 1812 | 81 | 151 | 69 | 93 |
| B3 | 2010 | 2011 | 2008 | 1887 | 78 | 139 | 77 | 136 |
| B4 | 1584 | 1581 | 1574 | 1386 | 73 | 94 | 75 | 96 |
| B5 | 2157 | 2151 | 2146 | 2010 | 79 | 144 | 81 | 149 |
| B6 | 1656 | 1653 | 1649 | 1488 | 70 | 87 | 71 | 90 |
| B7 | 1940 | 1848 | 1822 | 1472 | 71 | 95 | 73 | 94 |
| B8 | — | — | — | — | — | — | — | — |
| B9 | 1938 | 1935 | 1929 | 1806 | 88 | 146 | 76 | 100 |
| B10 | 1942 | 1940 | 1936 | 1810 | 78 | 141 | 73 | 94 |
| B11 | 1938 | 1937 | 1934 | 1816 | 146 | — | 142 | — |

(Results Observation)

In the battery B1 having no porous film, the heat generation after 1 second was notable regardless of the nail penetration speed. On the other hand, in the batteries A1 and A2, in which the porous film was formed on the positive electrode or the negative electrode, the heat generation after the nail penetration was suppressed greatly.

As all the batteries after nail penetration tests were disassembled and checked, it was found that in all batteries, the sheet separator was melted in a widespread area. However, in the batteries A1 and A2, it was found that the porous film kept its original shape. Based on this, it can be thought that when the porous film has enough heat resistance, the short circuit occurred after the nail penetration will not destroy the film structure, will suppress the expansion of the short circuit part, and will prevent excessive generation of heat.

On the other hand, in the battery B2 in which the porous film was formed on the sheet separator, it was found that the heat generation is accelerated when the nail penetration speed is slow. As the batteries of the battery B2 were disassembled, it was found that porous film also deformed with the above mentioned melting of the separator. This is probably because when the base substrate which supports the porous film to the horizontal direction is a separator, and when the separator shrinks or melts, the porous film has to follow the changes in form of the separator, no matter how the porous film itself has the heat resistance.

Herein, characteristics of the nail penetration test, which is a substitutional evaluation for the internal short circuit, and the data interpretation were explained in detail. First, regarding causes of the heat generation by the nail penetration test, following can be explained from the past evaluation results. When a positive electrode and a negative electrode make a contact (a short circuit) by a nail penetration, the Joule heat is generated. Then, a material (separator) with a low heat resistance is melted by the Joule heat to form a strong short circuit portion. As a result, the Joule heat is continued to be generated, and the temperature of the positive electrode is increased to the temperature range (160° C. or more) where the positive electrode becomes thermally unstable. The thermal runaway is thus caused.

Also, when the nail penetration speed is decreased, an acceleration of a local heat generation was observed. This is probably because when the short circuit area is limited by slowing the nail penetration speed per a unit time, a considerable amount of heat concentrates on the limited portion, to accelerate the temperature to reach the temperature range where the positive electrode becomes thermally unstable.

On the other hand, when the nail penetration speed is increased to expand the short circuit area per a unit time, the heat is dispersed to a greater area, thereby making it difficult for the positive electrode to reach the temperature range where it becomes thermally unstable.

Currently, in various uses, the safety standard for the lithium ion secondary battery is becoming strict. Under such circumstances, the present invention which can suppress the thermal runaway is highly practical, regardless of the nail penetration speed (short circuit state).

As to the thickness of the porous film, in the battery B4 having an excessively thick porous film, designed capacity decreased and capacity under the high-rate discharge decreased, due to shortened length of the electrode plate forming the electrode plate group. Therefore, in order to embody the effects of the present invention sufficiently, it is desirable that the thickness of the porous film is 0.5 to 20 µm.

In the battery B6 which had the sheet separator with an excessive thickness, the designed capacity declined to a greater degree, and the capacity under the high-rate discharge declined, due to the shortened length of the electrode plate which formed the electrode plate group. Therefore, in order to embody the effects of the present invention fully, it is desirable that the thickness of the separator is 30 µm or below. However, in order to suppress the heat generation involved with the melting of the separator sufficiently, it is desirable that the thickness is 8 µm or more.

The filler content in the porous film is explained next.

In the battery B7 in which the filler content relative to the filler and the first binder in total was small (binder amount was large), a capacity decline under the high-rate discharge could be seen. This is probably because the ion conductivity of the porous film declined due to the excessive first binder and insufficient gaps among the filler particles.

In the battery B9 which used CMC and in the battery B10 which used PVDF, as the first binder in the porous film, the heat generation was not suppressed when the nail penetration speed was slowed. When these batteries were disassembled and checked, it was found that the porous film deformed in addition to the separator.

In battery B9, CMC (a decomposition temperature of 245° C.) was probably burned out due to the Joule heat of the short circuit, causing the damages to the adhesiveness of the porous film. Also, in the battery B10, the deformation of the porous was caused probably due to the melting of PVDF (a crystalline melting point of 174° C.). Additionally, in both cases, a strong short circuit portion was formed by the penetration of the nail and the heat generation probably was not suppressed.

Therefore, it is necessary to use, for the porous film, a first binder which is not easily burned out or melted itself, more concretely, at least one kind of binder having a boundary temperature such as a crystalline melting point and a decomposition temperature of 250° C. or more. From the above evaluation results, it can be understood that a rubber including an acrylonitrile unit which is amorphous and has a high heat resistance (a heat decomposition temperature of 320° C.) can be used preferably.

The rubber including an acrylonitrile unit has rubber elasticity. This property functions very advantageously in the wound-type electrode plate group formation. For example, in the battery A4 in which the binder had the rubber elasticity, the porous film after the winding kept its form sufficiently, and there was no defect. On the other hand, in the battery B9 and B10, the flexibility evaluation of the porous film showed poor results.

Also, in the battery B9, the defects in appearance due to the deformation of the negative electrode were shown after the formation of the porous film. As is mentioned above, this is probably the results of the swelling of the thickener in the negative electrode by water included in the porous film before drying. In order to avoid such low yields, a water-insoluble first binder should be used for the porous film, and water should not be used as a dispersion medium of the raw material paste for porous film. More generally, a dispersion medium different from the dispersion medium used in the raw material paste for negative electrode material mixture layer (negative electrode paste) should be used to form the porous film.

In the battery A18 in which titania was used instead of alumina as the filler, it was confirmed that titania achieved various functions almost same as alumina. On the other hand, in the battery B11 which used polyethylene beads (PE beads), the level of the nail penetration safety was almost the same level with the battery B1 without the porous film. From the above, it can be seen that the porous film cannot fully achieve the functions to improve the safety when the filler having just the same level of heat resistance with the sheet separator was used. Therefore, it is desirable that for the filler, inorganic oxide is selected.

The structure of the negative electrode is explained in the following.

As shown by the battery D7, when PVDF was used in the negative electrode, the second binder content in the negative electrode was inevitably increased, thereby decreasing lithium ion acceptability of the negative electrode to cause a gradual decrease in the charge capacity. Additionally, based on the property of PVDF, the negative electrode plate was hardened, becoming unable to make the most of the flexibility of the porous film. Therefore, it is desirable that a binder, like SBR which has rubber elasticity and which can give sufficient adhesiveness to the negative electrode material mixture layer by a small amount is used in combination with a water-soluble binder (CMC or the like).

Example 3

Battery C1
(a) Preparation of Raw Material Paste of Porous Film

A raw material paste for porous film was prepared by mixing 970 g of AKP50 (α-alumina with a median diameter of 0.1 to 0.3 µm) as a filler manufactured by Sumitomo Chemical Co. Ltd., 375 g of BM-720H manufactured by ZEON Corporation (NMP solution containing 8 wt % of the first rubber including a polyacrylonitrile chain as a first binder), and an appropriate amount of NMP in the double-arm kneader.

Properties of BM-720H are shown in the following.
<1> Crystalline Melting Point: None (amorphous)
<2> Decomposition Temperature: 320° C.
<3> Affinity with Water: Water-Insoluble The properties of AKP50 are shown in the following.
<1> Surface Alkalinity: pH=9
<2> BET Specific Surface Area: about 10 m$^2$/g
<3> Heat Resistance: 250° C. or more As shown in the above, since alkalinity of AKP50 was pH=9, it was confirmed that AKP50 had an alkaline site on its surface.

Also, it is known that AKP50 is α-alumina, and its heat resistance is known as 250° C. or more.

(b) Fabrication of Positive Electrode

A positive electrode material mixture paste was prepared by mixing 3 kg of lithium cobaltate, 1 kg of PVDF#1320 (NMP solution containing 12 wt % of PVDF) manufactured by Kureha Chemical Industry Co., Ltd. as a binder, 90 g of acetylene black, and an appropriate amount of NMP, with a double-arm kneader. This paste was applied on an aluminum foil with a thickness of 15 μm, and rolled after drying, to form a positive electrode material mixture layers. At this time, the thickness of an electrode plate comprising the aluminum foil and the material mixture layers was set as 160 μm. Afterwards, the electrode plate was slit to give a width which could be inserted into a can battery case of a cylindrical battery (product number 18650), to obtain a positive electrode hoop.

(c) Preparation of Negative Electrode

A negative electrode material mixture paste was prepared by mixing 3 kg of artificial graphite, 75 g of BM-400B (aqueous dispersion including 40 wt % of styrene-butadiene copolymer as a second binder (second rubber particle)) manufactured by ZEON Corporation, 30 g of CMC as a water-soluble polymer, and an appropriate amount of water with a double-arm kneader. This paste was applied on a copper foil with a thickness of 10 μm, and rolled after drying, to form a negative electrode material mixture layer. At this time, the electrode plate comprising the copper foil and the material mixture layers was set as 180 μm. Afterwards, the electrode plate was cut to give a width which could be inserted into the can battery case of the cylindrical battery (product number), to obtain a negative electrode hoop.

(d) Formation of Porous Film

The raw material paste for porous film was applied on both sides of the positive electrode hoop, and then dried, to form a porous film having a thickness of 5 μm per side adhered to the positive electrode surface.

(e) Preparation of Electrolyte

The electrolyte was prepared by dissolving LiPF$_6$ in a mixed solvent of ethylene carbonate (EC), dimethyl carbonate (DMC), and methyl ethyl carbonate (MEC) with a volume ratio of 2:3:3, to give a concentration of 1 mol/L, and further adding 3 wt % of vinylene carbonate (VC) thereto.

(f) Fabrication of Battery

The above positive electrode and the negative electrode were cut to give a predetermined length, respectively, and were wound interposing a sheet separator with a thickness of 20 μm comprising a microporous film made of polyethylene, and then were inserted into the battery case. Then, 5.5 g of the above electrolyte was weighed and injected into the battery case, and the opening of the case was sealed. A cylindrical-shape lithium ion secondary battery C1 was thus made.

Battery D1

A battery D1 was made in the same manner as the battery C1, except that the porous film was not formed on both sides of the positive electrode hoop.

Battery D2

The raw material paste for porous film was applied on both sides of the separator comprising polyethylene-made microporous film, and then dried, to form a porous film having a thickness of 5 μm per side adhered to the separator surface. Battery D2 was made in the same manner as the battery D1, except that the separator having the porous film thus obtained was used.

Battery C2

The raw material paste for porous film was applied on both sides of the negative electrode hoop, and then dried, to form a porous film having a thickness of 0.5 μm per side adhered to the negative electrode surface. Battery C2 was made in the same manner as the battery D1, except that the negative electrode having the porous film thus obtained was used.

Battery C3

The raw material paste for porous film was applied on both sides of the negative electrode hoop, and then dried, to form a porous film having a thickness of 1 μm per side adhered to the negative electrode surface. Battery C3 was made in the same manner as the battery D1, except that the negative electrode having the porous film thus obtained was used.

Battery C4

The raw material paste for porous film was applied on both sides of the negative electrode hoop, and then dried, to form a porous film having a thickness of 5 μm per side adhered to the negative electrode surface. Battery C4 was made in the same manner as the battery D1, except that the negative electrode having the porous film thus obtained was used.

Battery C5

The raw material paste for porous film was applied on both sides of the negative electrode hoop, and then dried, to form a porous film having a thickness of 10 μm per side adhered to the negative electrode surface. Battery C5 was made in the same manner as the battery D1, except that the negative electrode having the porous film thus obtained was used.

Battery C6

The raw material paste for porous film was applied on both sides of the negative electrode hoop, and then dried, to form a porous film having a thickness of 15 μm per side adhered to the negative electrode surface. Battery C6 was made in the same manner as the battery D1, except that the negative electrode having the porous film thus obtained was used.

Battery C7

The raw material paste for porous film was applied on both sides of the negative electrode hoop, and then dried, to form a porous film having a thickness of 20 μm per side adhered to the negative electrode surface. Battery C7 was made in the same manner as the battery D1, except that the negative electrode having the porous film thus obtained was used.

Battery C8

The raw material paste for porous film was applied on both sides of the negative electrode hoop, and then dried, to form a porous film having a thickness of 30 μm per side adhered to the negative electrode surface. Battery C8 was made in the same manner as the battery D1, except that the negative electrode having the porous film thus obtained was used.

Battery C9

A battery C9 in which a thickness of the porous film adhered to the negative electrode surface was 5 μm per side thereof was made in the same manner as the battery C4, except that the thickness of the sheet separator was set as 8 μm.

Battery C10

A battery C10 in which a thickness of the porous film adhered to the negative electrode surface was 5 μm per side thereof was made in the same manner as the battery C4, except that the thickness of the sheet separator was set as 10 μm.

Battery C11

A battery C11 in which a thickness of the porous film adhered to the negative electrode surface was 5 μm per side thereof was made in the same manner as the battery C4, except that the thickness of the sheet separator was set as 15 μm.

Battery C12

A battery C12 in which a thickness of the porous film adhered to the negative electrode surface was 5 μm per side thereof was made in the same manner as the battery C4, except that the thickness of the sheet separator was set as 25 μm.

Battery C13

A battery C13 in which a thickness of the porous film adhered to the negative electrode surface was 5 μm per side thereof was made in the same manner as the battery C4, except that the thickness of the sheet separator was set as 30 μm.

Battery C14

A battery C14 in which a thickness of the porous film adhered to the negative electrode surface was 5 μm per side thereof was made in the same manner as the battery C4, except that the thickness of the sheet separator was set as 40 μm.

Battery C15

A battery C15 in which a thickness of the porous film adhered to the negative electrode surface was 5 μm per side thereof was made in the same manner as the battery C4, except that the filler content relative to the total of the filler and the first binder was set as 30 wt %.

Battery C16

A battery C16 in which a thickness of the porous film adhered to the negative electrode surface was 5 μm per side thereof was made in the same manner as the battery C4, except that the filler content relative to the total of the filler and the first binder was set as 50 wt %.

Battery C17

A battery C17 in which a thickness of the porous film adhered to the negative electrode surface was 5 μm per side thereof was made in the same manner as the battery C4, except that the filler content relative to the total of the filler and the first binder was set as 70 wt %.

Battery C18

A battery C18 in which a thickness of the porous film adhered to the negative electrode surface was 5 μm per side thereof was made in the same manner as the battery C4, except that the filler content relative to the total of the filler and the first binder was set as 90 wt %.

Battery C19

A battery C19 in which a thickness of the porous film adhered to the negative electrode surface was 5 μm per side thereof was made in the same manner as the battery C4, except that the filler content relative to the total of the filler and the first binder was set as 95 wt %.

Battery C20

A battery C20 in which a thickness of the porous film adhered to the negative electrode surface was 5 μm per side thereof was made in the same manner as the battery C4, except that the filler content relative to the total of the filler and the first binder was set as 99 wt %.

Battery D3

A battery D3 in which a thickness of the porous film adhered to the negative electrode surface was 5 μm per side thereof was made in the same manner as the battery D4, except that a water-soluble CMC was used instead of BM-720H as the first binder to prepare the raw material paste for porous film. Since CMC was used as the first binder, in Battery D3, as a dispersion medium of the raw material paste, water was used instead of NMP. CMC does not have a crystalline melting point, is amorphous, and has a decomposition temperature of 245° C.

Battery D4

A battery D4 in which a thickness of the porous film adhered to the negative electrode surface was 5 μm per side thereof was made in the same manner as the battery D4, except that water-insoluble PVDF was used as the first binder instead of BM-720H to prepare the raw material paste for porous film. A crystalline melting point and a decomposition temperature of PVDF are 174° C. and 360° C., respectively.

Battery C21

A battery C21 in which a thickness of the porous film adhered to the negative electrode surface was 5 μm per side thereof was made in the same manner as the battery C4, except that, instead of AKP50 (α-alumina having a median diameter of 0.1 to 0.3 μm), titania (titanium oxide) having the same median diameter was used.

For the titania, TA300 (anatase-type) manufactured by FUJI TITANIUM INDUSTRY CO., LTD. was used. The BET specific surface area of the titania was 8 m$^2$/g, and the titania surface had an alkalinity of pH=8. The heat resistance of polyethylene beads was below 250° C., the BET specific surface area was 10 m$^2$/g, and the pH of beads surface was 6.

Battery C22

A battery C22 in which a thickness of the porous film adhered to the negative electrode surface was 5 μm per side thereof was made in the same manner as the battery C4, except that a linear type PPS (polyphenylene sulfide, median diameter of 0.5 μm) manufactured by DAINIPPON INK AND CHEMICALS, INCORPORATED was used instead of AKP50. The PPS surface had an alkalinity of pH=7.4 to 8, the BET specific surface area was 7.4 m$^2$/g, and the PPS had an excellent heat-resistance over 250° C. (melting point of 280° C.).

Battery C23

A battery C23 in which a thickness of the porous film adhered to the negative electrode surface was 5 μm per side thereof was made in the same manner as the battery C4, except that AA2 (alumina Z) manufactured by Sumitomo Chemical Co., Ltd. was used instead of AKP50. The AA2 surface had an alkalinity of pH=9, and the BET specific surface area of 1.0 m$^2$/g.

Battery C24

A battery C24 in which a thickness of the porous film adhered to the negative electrode surface was 5 μm per side thereof was made in the same manner as the battery C4, except that the titania (titania Y) with the surface alkalinity of pH=8, and the BET specific surface area of 1.0 m$^2$/g was used instead of AKP50.

Battery C25

A battery C25 in which a thickness of the porous film adhered to the negative electrode surface was 5 μm per side thereof was made in the same manner as the battery C4, except that AA2 (alumina Y) manufactured by Sumitomo Chemical Co., Ltd. was used instead of AKP50. The AA2 surface had an alkalinity of pH=9, and the BET specific surface area of 0.9 m$^2$/g.

Battery C26

A battery C26 in which a thickness of the porous film adhered to the negative electrode surface was 5 μm per side thereof was made in the same manner as the battery C4, except that titania (titania X) with the surface alkalinity of pH=8, and the BET specific surface area of 0.9 m²/g was used instead of AKP50.

Battery D5

A battery D5 in which a thickness of the porous film adhered to the negative electrode surface was 5 μm per side thereof was made in the same manner as the battery C4, except that crosslinked-type PPS (polyphenylene sulfide, median diameter of 0.5 μm) was used instead of AKP50. The BET specific surface area of the crosslinked-type PPS was 7.4 m²/g, same as the above, and the pH of the surface thereof was 6.

Battery D6

A battery D6 in which a thickness of the porous film adhered to the negative electrode surface was 5 μm per side thereof was made in the same manner as the battery C4, except that a silica powder was used instead of AKP50. For the silica powder, Sunsphere NP30 manufactured by ASAHI GLASS CO., LTD. was used. The BET specific surface area of the silica powder was 40 m²/g, and the pH of the surface of the silica powder was 6.

Battery D7

An alumina (alumina X) with the BET specific surface area of 10 m²/g, and the surface of pH=6 was used instead of AKP50. Additionally, in fabricating the negative electrode, instead of BM400B as a binder B and CMC as a thickener, 8 wt % of PVDF relative to the artificial graphite was used. Herein, for the PVDF, PVDF#1320 used for the binder of the positive electrode was used. Other than the above, a battery D7 in which the porous film adhered to the negative electrode surface has a thickness of 5 μm per side thereof was made in the same manner as the battery C4.

The configuration of the porous film is summarized and shown in Table 5. Additionally, the thickness of the sheet separator and the kinds of the second binder used for the negative electrode are summarized and shown in Table 6.

TABLE 5

| | | Porous Film | | | | First Binder | |
|---|---|---|---|---|---|---|---|
| Battery No. | Film Adhered Portion | Thickness (μm) | Filler Kind | Content (wt %) | Kind | Crystalline Melting Point (° C.) | Decomposition Temp. (° C.) |
| C1 | Pos. Elec. | 5 | AKP50 | 97 | BM720H | None | 320 |
| C2 | Neg. Elec. | 0.5 | AKP50 | 97 | BM720H | None | 320 |
| C3 | Neg. Elec. | 1 | AKP50 | 97 | BM720H | None | 320 |
| C4 | Neg. Elec. | 5 | AKP50 | 97 | BM720H | None | 320 |
| C5 | Neg. Elec. | 10 | AKP50 | 97 | BM720H | None | 320 |
| C6 | Neg. Elec. | 15 | AKP50 | 97 | BM720H | None | 320 |
| C7 | Neg. Elec. | 20 | AKP50 | 97 | BM720H | None | 320 |
| C8 | Neg. Elec. | 30 | AKP50 | 97 | BM720H | None | 320 |
| C9 | Neg. Elec. | 5 | AKP50 | 97 | BM720H | None | 320 |
| C10 | Neg. Elec. | 5 | AKP50 | 97 | BM720H | None | 320 |
| C11 | Neg. Elec. | 5 | AKP50 | 97 | BM720H | None | 320 |
| C12 | Neg. Elec. | 5 | AKP50 | 97 | BM720H | None | 320 |
| C13 | Neg. Elec. | 5 | AKP50 | 97 | BM720H | None | 320 |
| C14 | Neg. Elec. | 5 | AKP50 | 97 | BM720H | None | 320 |
| C15 | Neg. Elec. | 5 | AKP50 | 50 | BM720H | None | 320 |
| C16 | Neg. Elec. | 5 | AKP50 | 70 | BM720H | None | 320 |
| C17 | Neg. Elec. | 5 | AKP50 | 90 | BM720H | None | 320 |
| C18 | Neg. Elec. | 5 | AKP50 | 95 | BM720H | None | 320 |
| C19 | Neg. Elec. | 5 | AKP50 | 99 | BM720H | None | 320 |
| C20 | Neg. Elec. | 5 | AKP50 | 30 | BM720H | None | 320 |
| C21 | Neg. Elec. | 5 | TA300 | 97 | BM720H | None | 320 |
| C22 | Neg. Elec. | 5 | Alkaline PPS | 97 | BM720H | None | 320 |
| C23 | Neg. Elec. | 5 | Alumina Z | 97 | BM720H | None | 320 |
| C24 | Neg. Elec. | 5 | Titania Y | 97 | BM720H | None | 320 |
| C25 | Neg. Elec. | 5 | Alumina Y | 97 | BM720H | None | 320 |
| C26 | Neg. Elec. | 5 | Titania X | 97 | BM720H | None | 320 |
| D1 | None | — | — | — | — | — | — |
| D2 | Separator | 5 | AKP50 | 97 | BM720H | None | 320 |
| D3 | Neg. Elec. | 5 | AKP50 | 97 | CMC | None | 245 |
| D4 | Neg. Elec. | 5 | AKP50 | 97 | PVDF | 174 | 360 |
| D5 | Neg. Elec. | 5 | Acidic PPS | 97 | BM720H | None | 320 |
| D6 | Neg. Elec. | 5 | Silica | 97 | BM720H | None | 320 |
| D7 | Neg. Elec. | 5 | Alumina X | 97 | BM720H | None | 320 |

TABLE 6

| Battery No. | Separator Thickness (μm) | Negative Electrode Binder | Porous Film Adhesiveness | Flexibility (No. of Defects) | Negative Electrode Appearance |
|---|---|---|---|---|---|
| C1 | 20 | BM400B + CMC | OK | 0 | No Change |
| C2 | 20 | BM400B + CMC | OK | 0 | No Change |
| C3 | 20 | BM400B + CMC | OK | 0 | No Change |
| C4 | 20 | BM400B + CMC | OK | 0 | No Change |
| C5 | 20 | BM400B + CMC | OK | 0 | No Change |
| C6 | 20 | BM400B + CMC | OK | 0 | No Change |
| C7 | 20 | BM400B + CMC | OK | 0 | No Change |
| C8 | 20 | BM400B + CMC | OK | 1 | No Change |
| C9 | 8 | BM400B + CMC | OK | 0 | No Change |
| C10 | 10 | BM400B + CMC | OK | 0 | No Change |
| C11 | 15 | BM400B + CMC | OK | 0 | No Change |
| C12 | 25 | BM400B + CMC | OK | 0 | No Change |
| C13 | 30 | BM400B + CMC | OK | 0 | No Change |
| C14 | 40 | BM400B + CMC | OK | 0 | No Change |
| C15 | 20 | BM400B + CMC | OK | 0 | No Change |
| C16 | 20 | BM400B + CMC | OK | 0 | No Change |
| C17 | 20 | BM400B + CMC | OK | 0 | No Change |
| C18 | 20 | BM400B + CMC | OK | 0 | No Change |
| C19 | 20 | BM400B + CMC | OK | 1 | No Change |
| C20 | 20 | BM400B + CMC | OK | 0 | No Change |
| C21 | 20 | BM400B + CMC | OK | 0 | No Change |
| C22 | 20 | BM400B + CMC | OK | 0 | No Change |
| C23 | 20 | BM400B + CMC | OK | 0 | No Change |
| C24 | 20 | BM400B + CMC | OK | 0 | No Change |
| C25 | 20 | BM400B + CMC | OK | 1 | No Change |
| C26 | 20 | BM400B + CMC | OK | 1 | No Change |
| D1 | 20 | BM400B + CMC | — | — | No Change |
| D2 | 20 | BM400B + CMC | OK | 0 | No Change |
| D3 | 20 | BM400B + CMC | OK | 8 | Changed |
| D4 | 20 | BM400B + CMC | OK | 5 | No Change |
| D5 | 20 | BM400B + CMC | OK | 3 | No Change |
| D6 | 20 | BM400B + CMC | OK | 4 | No Change |
| D7 | 20 | PVDF | OK | 2 | No Change |

(Evaluation)

For the above produced porous film and the completed lithium ion secondary battery, porous film adhesiveness, negative electrode appearance, porous film flexibility, battery designed capacity, charge and discharge characteristics of the battery, and the nail penetration safety were evaluated in the same manner as Example 2. The results are shown in Tables 6 to 7.

TABLE 7

| | Battery | | | | | | | |
|---|---|---|---|---|---|---|---|---|
| | | Charge and Discharge Characteristics | | | Nail Penetration Safety | | | |
| | | | | | Nail Speed 5 mm/s | | Nail Speed 180 mm/s | |
| | Designed | 400 mAh | | 4000 mAh | Temperature Reached | | Temperature Reached | |
| Battery No. | Capacity (mAh) | Charge (mAh) | Discharge (mAh) | Discharge (mAh) | After 1 sec. (° C.) | After 90 sec. (° C.) | After 1 sec. (° C.) | After 90 sec. (° C.) |
| C1 | 1944 | 1941 | 1938 | 1819 | 72 | 91 | 70 | 88 |
| C2 | 2008 | 2010 | 2006 | 1879 | 76 | 89 | 69 | 93 |
| C3 | 2001 | 1999 | 1996 | 1881 | 71 | 92 | 74 | 94 |
| C4 | 1943 | 1941 | 1939 | 1821 | 74 | 94 | 72 | 89 |
| C5 | 1872 | 1875 | 1874 | 1759 | 68 | 88 | 76 | 90 |
| C6 | 1801 | 1799 | 1796 | 1688 | 69 | 96 | 69 | 96 |
| C7 | 1729 | 1730 | 1728 | 1622 | 77 | 90 | 70 | 91 |
| C8 | 1584 | 1581 | 1574 | 1386 | 73 | 94 | 75 | 96 |
| C9 | 2126 | 2124 | 2119 | 1989 | 72 | 91 | 73 | 94 |
| C10 | 2094 | 2090 | 2086 | 1962 | 70 | 97 | 74 | 87 |
| C11 | 2014 | 2016 | 2012 | 1902 | 65 | 93 | 72 | 95 |
| C12 | 1873 | 1874 | 1870 | 1760 | 74 | 96 | 71 | 90 |
| C13 | 1800 | 1797 | 1792 | 1679 | 71 | 89 | 73 | 94 |
| C14 | 1656 | 1653 | 1649 | 1488 | 70 | 87 | 71 | 90 |
| C15 | 2016 | 1988 | 1961 | 1737 | 66 | 88 | 69 | 91 |
| C16 | 2015 | 1999 | 1989 | 1811 | 70 | 96 | 72 | 89 |
| C17 | 2017 | 2019 | 2015 | 1893 | 70 | 94 | 68 | 89 |
| C18 | 2014 | 2015 | 2009 | 1883 | 73 | 91 | 73 | 88 |
| C19 | 2015 | 2015 | 2010 | 1886 | 69 | 88 | 74 | 92 |
| C20 | 2017 | 1848 | 1822 | 1472 | 71 | 95 | 73 | 94 |
| C21 | 2014 | 2012 | 2005 | 1880 | 72 | 90 | 71 | 93 |
| C22 | 2014 | 2010 | 2002 | 1874 | 71 | 89 | 69 | 88 |
| C23 | 1944 | 1940 | 1938 | 1822 | 75 | 93 | 73 | 91 |
| C24 | 1944 | 1941 | 1937 | 1819 | 75 | 95 | 74 | 91 |
| C25 | 1942 | 1923 | 1889 | 1769 | 78 | 97 | 75 | 95 |
| C26 | 1939 | 1919 | 1881 | 1762 | 77 | 98 | 74 | 96 |
| D1 | 2015 | 2014 | 2003 | 1888 | 146 | — | 138 | — |
| D2 | 1944 | 1939 | 1935 | 1812 | 81 | 151 | 69 | 93 |
| D3 | 2012 | 2014 | 2004 | 1880 | 88 | 146 | 76 | 100 |
| D4 | 2015 | 2016 | 2011 | 1896 | 78 | 141 | 73 | 94 |
| D5 | 2013 | 1837 | 1811 | 1789 | 83 | 149 | 82 | 147 |
| D6 | 2014 | 1796 | 1746 | 1704 | 87 | 154 | 88 | 151 |
| D7 | 2016 | 1961 | 1958 | 1819 | 70 | 93 | 69 | 90 |

(Results Consideration)

First, in the battery D1 having no porous film, regardless of the nail penetration speed, the heat generation after 1 second was notable. As opposed to this, in the batteries C1 and C2 in which the porous film was formed on the positive electrode or the negative electrode, the heat generation after the nail penetration was suppressed greatly. When all the batteries were disassembled and checked after the nail penetration test, in all batteries, the sheet separator was melted in a widespread area. However, with regard to the batteries C1 and C2, the porous film kept its original shape.

On the other hand, in the battery D2 in which the porous film was formed on the sheet separator, it could be seen that the heat generation was accelerated when the nail penetration speed was slow. When the battery D2 was disassembled and checked, it was confirmed that the porous film deformed with the melting of the separator.

With regard to the thickness of the porous film, in the battery C8 with an excessive thickness of the porous film, due to the shortened length of the electrode plate which formed the electrode plate group, designed capacity was decreased, and the capacity under the high-rate discharge was declined.

In the battery C14 with an excessive thickness of the sheet separator, due to the shortened length of the electrode plate which formed the electrode plate group, designed capacity was greatly decreased, and the capacity under the high-rate discharge was declined.

Then, in the battery C20 in which the filler content relative to the filler and the first binder in total was small (binder amount was large), the capacity decline under the high-rate discharge could be seen. This is probably because the ion conductivity of the porous film declined due to the excessive first binder and insufficient gaps among the filler particles.

In the battery D3 in which CMC was used and in the battery D4 in which PVDF was used, as the first binder in the porous film, the heat generation could not be suppressed when the nail penetration speed was decreased. When these batteries were disassembled and checked, it could be confirmed that not only the separator, but the porous film deformed as well.

Also, although in the battery C4 in which the binder had rubber elasticity, it was shown that the porous film after winding kept its shape sufficiently and had no defects, in the batteries D3 and D4, the results of the evaluation for the porous film flexibility were poor. Further, in the battery D3, the appearance defects due to the negative electrode deformation were seen after the formation of the porous film. This is probably the result of the swelling of the thickener in the negative electrode by water included in the porous film before drying, as mentioned above.

Also, in the battery C21 in which titania was used instead of alumina as the filler, it was confirmed that titania achieved various functions almost same as alumina.

Next, as shown by the battery D7, when PVDF was used for the second binder of the negative electrode, the amount of the second binder inevitably increased, to decrease lithium ion acceptability of the negative electrode and to gradually decrease the charge capacity. Also, based on the properties of PVDF, the negative electrode plate hardened.

Also, with regard to the speed of the electrolyte injection at the time of battery fabrication, the battery C25 was slower than the battery C23, taking 1.6 times more injection time. Also, the battery C26 had a slower speed of the electrolyte injection than the battery C24, taking 1.4 times more injection time. On the other hand, the injection speeds in the battery C4 and in the battery C23 were not much different, and the injection speeds in the battery C21 and in the battery C24 were not much different as well. From the above, it can be seen that the ease of the electrolyte injection changes greatly depending on the BET specific surface area of the filler with 0.9 $m^2/g$ as the borderline. Thus, it can be seen that the BET specific surface area of the filler is preferably 0.9 $m^2/g$ or more, in terms of productivity as well.

Example 4

Battery E1
(a) Preparation of Raw Material Paste of Porous Film

A raw material paste for porous film was prepared by mixing 970 g of an anatase-type titanium oxide powder (median diameter 0.09 μm) which was classified by a sieve to give the maximum particle size of 0.1 μm, 375 g of BM-720H (NMP solution containing 8 wt % of a rubber including an acrylonitrile unit, as a first binder) manufactured by Zeon Corporation, and an appropriate amount of NMP in a double-arm kneader.

The properties of the titanium oxide powder used in this Example are shown below.
<1> Surface Alkalinity: pH=8
<2> Heat Resistance: 800° C. or more
<3> Particle Size: The Maximum Particle Size 0.1 μm
(b) Fabrication of Positive Electrode A positive electrode material mixture paste was prepared by mixing 3 kg of lithium cobaltate, 1 kg of PVDF#1320 (N-methyl-2-pyrrolidone (NMP) solution including 12 wt % of PVDF) manufactured by Kureha Chemical Industry Co., Ltd. as a binder, 90 g of acetylene black as a conductive agent, and an appropriate amount of NMP, with a double-arm kneader. This paste was applied on an aluminum foil with a thickness of 15 μm, and rolled after drying, to form a positive electrode material mixture layer. At this time, the thickness of the electrode plate comprising the aluminum foil and the material mixture layers was set as 160 μm. Afterwards, the electrode plate was slit to give a width which could be inserted into a can battery case of a cylindrical battery (product number 18650) to obtain a positive electrode hoop.
(c) Fabrication of Negative Electrode A negative electrode material mixture paste was prepared by mixing 3 kg of artificial graphite, 75 g of BM-400B (aqueous dispersion including 40 wt % of styrene-butadiene copolymer (rubber particles) as a second binder) manufactured by ZEON Corporation, 30 g of CMC as a thickener, and an appropriate amount of water with a double-arm kneader. This paste was applied on a copper foil with a thickness of 10 mm, and rolled after drying, to form a negative electrode material mixture layer. At this time, the thickness of the electrode plate comprising the copper foil and the material mixture layers was set as 180 μm. Afterwards, the electrode plate was slit to give a width which could be inserted into the can battery case of the cylindrical battery (product number 18650), to obtain a negative electrode hoop.
(d) Formation of Porous Film The raw material paste for porous film was applied on both sides of the positive electrode hoop, and then dried, to form a porous film having a thickness of 5 μm per side adhered to the positive electrode surface.
(e) Preparation of Electrolyte An electrolyte was prepared by dissolving $LiPF_6$ in a mixed solvent of ethylene carbonate (EC), dimethyl carbonate (DMC), and methyl ethyl carbonate (MEC) with a volume ratio of 2:3:3, to give a concentration of 1 mol/L and further adding 3 wt % of vinylene carbonate (VC) thereto.
(f) Fabrication of Battery The above positive electrode and the negative electrode were cut to give a predetermined length, respectively, and were wound interposing a sheet separator with a thickness of 20 μm comprising a microporous film made of polyethylene, and then were inserted into the battery case. Then, 5.5 g of the above electrolyte was weighed and injected into the battery case, and the opening of the case was sealed. A cylindrical-shape 18650 lithium ion secondary battery E1 was thus made.

Battery F1

A battery F1 was made in the same manner as the battery E1, except that the porous film was not formed on both sides of the positive electrode hoop.

Battery F2

The raw material paste for porous film was applied on both sides of the sheet separator, and then dried, to form a porous film with a thickness of 5 μm per side adhered to the separator surface. A battery F2 was made in the same manner as the battery F1, except that the separator having the porous film thus obtained was used.

Battery E2

The raw material paste for porous film was applied on both sides of the negative electrode hoop, and then dried, to form a porous film with a thickness of 0.5 μm per side adhered to the negative electrode. A battery E2 was made in the same manner as the battery F1, except that the negative electrode having the porous film thus obtained was used.

Battery E3

The raw material paste for porous film was applied on both sides of the negative electrode hoop, and then dried, to form a porous film with a thickness of 1 μm per side adhered to the negative electrode surface. A battery E3 was made in the same manner as the battery F1, except that the negative electrode having the porous film thus obtained was used.

Battery E4

The raw material paste for porous film was applied on both sides of the negative electrode hoop, and then dried, to form a porous film with a thickness of 5 μm per side adhered to the negative electrode surface. A battery E4 was made in the same manner as the battery F1, except that the negative electrode having the porous film thus obtained was used.

Battery E5

The raw material paste for porous film was applied on both sides of the negative electrode hoop, and then dried, to form a porous film with a thickness of 10 μm per side adhered to the negative electrode surface. A battery E5 was made in the same manner as the battery F1, except that the negative electrode having the porous film thus obtained was used.

Battery E6

The raw material paste for porous film was applied on both sides of the negative electrode hoop, and then dried, to form a porous film with a thickness of 15 μm per side adhered to the negative electrode surface. A battery E6 was made in the same manner as the battery F1, except that the negative electrode having the porous film thus obtained was used.

Battery E7

The raw material paste for porous film was applied on both sides of the negative electrode hoop, and then dried, to form a porous film with a thickness of 20 μm per side adhered to the negative electrode surface. A battery E7 was made in the same manner as the battery F1, except that the negative electrode having the porous film thus obtained was used.

Battery E8

The raw material paste for porous film was applied on both sides of the negative electrode hoop, and then dried, to form a porous film with a thickness of 30 μm per side adhered to the negative electrode surface. A battery E8 was made in the same manner as the battery F1, except that the negative electrode having the porous film thus obtained was used.

Battery E9

A battery E9 in which a thickness of the porous film adhered to the negative electrode surface was 5 μm per side thereof was made in the same manner as the battery E4, except that the thickness of the sheet separator was set as 8 μm.

Battery E10

A battery E10 in which a thickness of the porous film adhered to the negative electrode surface was 5 μm per side thereof was made in the same manner as the battery E4, except that the thickness of the sheet separator was set as 10 μm.

Battery E11

A battery E11 in which a thickness of the porous film adhered to the negative electrode surface was 5 μm per side thereof was made in the same manner as the battery E4, except that the thickness of the sheet separator was set as 15 μm.

Battery E12

A battery E12 in which a thickness of the porous film adhered to the negative electrode surface was 5 μm per side thereof was made in the same manner as the battery E4, except that the thickness of the sheet separator was set as 25 μm.

Battery E13

A battery E13 in which a thickness of the porous film adhered to the negative electrode surface was 5 μm per side thereof was made in the same manner as the battery E4, except that the thickness of the sheet separator was set as 30 μm.

Battery E14

A battery E14 in which a thickness of the porous film adhered to the negative electrode surface was 5 μm per side thereof was made in the same manner as the battery E4, except that the thickness of the sheet separator was set as 40 μm.

Battery E15

A battery E15 in which a thickness of the porous film adhered to the negative electrode surface was 5 μm per side thereof was made in the same manner as the battery E4, except that the content of the titanium oxide powder relative to the total of the titanium oxide powder and the binder was set as 30 wt %.

Battery E16

A battery E16 in which a thickness of the porous film adhered to the negative electrode surface was 5 μm per side thereof was made in the same manner as the battery E4, except that the content of the titanium oxide powder relative to the total of the titanium oxide powder and the binder was set as 50 wt %.

Battery E17

A battery E17 in which a thickness of the porous film adhered to the negative electrode surface was 5 μm per side thereof was made in the same manner as the battery E4, except that the content of the titanium oxide powder relative to the total of the titanium oxide powder and the binder was set as 70 wt %.

Battery E18

A battery E18 in which a thickness of the porous film adhered to the negative electrode surface was 5 μm per side thereof was made in the same manner as the battery E4, except that the content of the titanium oxide powder relative to the total of the titanium oxide powder and the binder was set as 90 wt %.

Battery E19

A battery E19 in which a thickness of the porous film adhered to the negative electrode surface was 5 μm per side thereof was made in the same manner as the battery E4, except that the content of the titanium oxide powder relative to the total of the titanium oxide powder and the binder was set as 95 wt %.

Battery E20

A battery E20 in which a thickness of the porous film adhered to the negative electrode surface was 5 μm per side thereof was made in the same manner as the battery E4, except that the content of the titanium oxide powder relative to the total of the titanium oxide powder and the binder was set as 99 wt %.

Battery F3

A battery F3 in which a thickness of the porous film adhered to the negative electrode surface was 5 μm per side thereof was made in the same manner as the battery E4, except that a water-soluble CMC was used instead of BM-720 as a binder to prepare the raw material paste for porous film. Herein, for the dispersion medium of the raw material paste, water was used instead of NMP.

Battery F4

A battery F4 in which a thickness of the porous film adhered to the negative electrode surface was 5 μm per side thereof was made in the same manner as the battery E4, except that a water-insoluble PVDF (crystalline melting point 174° C.) was used instead of BM-720 as a binder to prepare the raw material paste for porous film.

Battery F5

A battery F5 in which a thickness of the porous film adhered to the negative electrode surface was 5 μm per side thereof was made in the same manner as the battery E4, except that α-alumina with a median diameter of 0.3 μm was used instead of the titanium oxide powder with a median diameter of 0.09 μm. For the α-alumina, AKP50 manufactured by Sumitomo Chemical Co., Ltd. was used (surface alkalinity pH=9, BET specific surface area: about 10 m²/g, heat resistance: 250° C. or more).

Battery F6

In the fabrication of the negative electrode, instead of BM400B as a second binder and CMC as a thickener, 8 wt % of PVDF relative to the artificial graphite was used, and for the dispersion medium of the negative electrode paste, NMP was used. Herein, for the PVDF, PVDF#1320 which was used as a binder of the positive electrode was used. Except for the above, a battery F6 in which a thickness of the porous film adhered to the negative electrode surface was 5 μm per side thereof was made in the same manner as the battery E4.

The configuration of the porous film is summarized and shown in Table 8. The thickness of the sheet separator and the kind of the second binder used for the negative electrode were summarized and shown in Table 9.

TABLE 8

| | | Porous Film | | | | | |
|---|---|---|---|---|---|---|---|
| | | | | | | First Binder | |
| Battery No. | Film Adhered Portion | Thickness (μm) | Filler Kind | Content (wt %) | Kind | Crystalline Melting Point (° C.) | Decomposition Temperature (° C.) |
| E1 | Positive electrode | 5 | Titanium oxide | 97 | BM720H | None | 320 |
| E2 | Negative electrode | 0.5 | Titanium oxide | 97 | BM720H | None | 320 |
| E3 | Negative electrode | 1 | Titanium oxide | 97 | BM720H | None | 320 |
| E4 | Negative electrode | 5 | Titanium oxide | 97 | BM720H | None | 320 |
| E5 | Negative electrode | 10 | Titanium oxide | 97 | BM720H | None | 320 |
| E6 | Negative electrode | 15 | Titanium oxide | 97 | BM720H | None | 320 |
| E7 | Negative electrode | 20 | Titanium oxide | 97 | BM720H | None | 320 |
| E8 | Negative electrode | 30 | Titanium oxide | 97 | BM720H | None | 320 |
| E9 | Negative electrode | 5 | Titanium oxide | 97 | BM720H | None | 320 |
| E10 | Negative electrode | 5 | Titanium oxide | 97 | BM720H | None | 320 |
| E11 | Negative electrode | 5 | Titanium oxide | 97 | BM720H | None | 320 |
| E12 | Negative electrode | 5 | Titanium oxide | 97 | BM720H | None | 320 |
| E13 | Negative electrode | 5 | Titanium oxide | 97 | BM720H | None | 320 |
| E14 | Negative electrode | 5 | Titanium oxide | 97 | BM720H | None | 320 |
| E15 | Negative electrode | 5 | Titanium oxide | 30 | BM720H | None | 320 |
| E16 | Negative electrode | 5 | Titanium oxide | 50 | BM720H | None | 320 |
| E17 | Negative electrode | 5 | Titanium oxide | 70 | BM720H | None | 320 |
| E18 | Negative electrode | 5 | Titanium oxide | 90 | BM720H | None | 320 |
| E19 | Negative electrode | 5 | Titanium oxide | 95 | BM720H | None | 320 |

TABLE 8-continued

| | Porous Film | | | | | | |
|---|---|---|---|---|---|---|---|
| | | Film | Filler | | First Binder | | |
| | | | | | | Crystalline Melting | Decomposition |
| Battery No. | Adhered Portion | Thickness (μm) | Kind | Content (wt %) | Kind | Point (° C.) | Temperature (° C.) |
| E20 | Negative electrode | 5 | Titanium oxide | 99 | BM720H | None | 320 |
| F1 | None | — | — | — | — | — | — |
| F2 | Separator | 5 | Titanium oxide | 97 | BM720H | None | 320 |
| F3 | Negative electrode | 5 | Titanium oxide | 97 | CMC | None | 245 |
| F4 | Negative electrode | 5 | Titanium oxide | 97 | PVDF | 174 | 360 |
| F5 | Negative electrode | 5 | α-alumina | 97 | BM720H | None | 320 |
| F6 | Negative electrode | 5 | Titanium Oxide | 97 | BM720H | None | 320 |

TABLE 9

| | | | Porous Film | | |
|---|---|---|---|---|---|
| Battery No. | Separator Thickness (μm) | Negative Electrode Binder | Adhesiveness | Flexibility (No. of Defects) | Negative Electrode Appearance |
| E1 | 20 | BM400B + CMC | OK | 0 | No Change |
| E2 | 20 | BM400B + CMC | OK | 0 | No Change |
| E3 | 20 | BM400B + CMC | OK | 0 | No Change |
| E4 | 20 | BM400B + CMC | OK | 0 | No Change |
| E5 | 20 | BM400B + CMC | OK | 0 | No Change |
| E6 | 20 | BM400B + CMC | OK | 0 | No Change |
| E7 | 20 | BM400B + CMC | OK | 0 | No Change |
| E8 | 20 | BM400B + CMC | OK | 1 | No Change |
| E9 | 8 | BM400B + CMC | OK | 0 | No Change |
| E10 | 10 | BM400B + CMC | OK | 0 | No Change |
| E11 | 15 | BM400B + CMC | OK | 0 | No Change |
| E12 | 25 | BM400B + CMC | OK | 0 | No Change |
| E13 | 30 | BM400B + CMC | OK | 0 | No Change |
| E14 | 40 | BM400B + CMC | OK | 0 | No Change |
| E15 | 20 | BM400B + CMC | OK | 0 | No Change |
| E16 | 20 | BM400B + CMC | OK | 0 | No Change |
| E17 | 20 | BM400B + CMC | OK | 0 | No Change |
| E18 | 20 | BM400B + CMC | OK | 0 | No Change |
| E19 | 20 | BM400B + CMC | OK | 0 | No Change |
| E20 | 20 | BM400B + CMC | OK | 1 | No Change |
| F1 | 20 | BM400B + CMC | — | — | No Change |
| F2 | 20 | BM400B + CMC | OK | 0 | No Change |
| F3 | 20 | BM400B + CMC | OK | 8 | Changed |
| F4 | 20 | BM400B + CMC | OK | 5 | No Change |
| F5 | 20 | BM400B + CMC | OK | 0 | No Change |
| F6 | 20 | PVDF | OK | 2 | No Change |

(Evaluation)

For the above produced porous film and the completed lithium ion secondary battery, porous film adhesiveness, negative electrode appearance, porous film flexibility, battery designed capacity, charge and discharge characteristics of battery, and the nail penetration safety were evaluated in the same manner as Example 2. The results are shown in Tables 9 to 10.

TABLE 10

| | Battery | | | | | | | |
|---|---|---|---|---|---|---|---|---|
| | | | Charge And Discharge Characteristics | | Nail Penetration Safety | | | |
| | | | | | Nail Speed 5 mm/s | | Nail Speed 180 mm/s | |
| | Designed | | 400 mAh | 4000 mAh | Temperature Reached | | Temperature Reached | |
| Battery No. | Capacity (mAh) | Charge (mAh) | Discharge (mAh) | Discharge (mAh) | After 1 sec. (° C.) | After 90 sec. (° C.) | After 1 sec. (° C.) | After 90 sec. (° C.) |
| E1 | 1944 | 1941 | 1939 | 1822 | 72 | 90 | 68 | 87 |
| E2 | 2008 | 2010 | 2007 | 1879 | 76 | 89 | 69 | 93 |
| E3 | 2001 | 1999 | 1997 | 1883 | 71 | 91 | 74 | 94 |
| E4 | 1943 | 1941 | 1939 | 1823 | 74 | 92 | 72 | 89 |
| E5 | 1872 | 1875 | 1874 | 1764 | 68 | 88 | 76 | 90 |
| E6 | 1801 | 1799 | 1796 | 1691 | 69 | 94 | 68 | 96 |
| E7 | 1729 | 1730 | 1728 | 1622 | 77 | 89 | 70 | 91 |
| E8 | 1584 | 1581 | 1576 | 1386 | 73 | 94 | 75 | 96 |
| E9 | 2126 | 2124 | 2119 | 1989 | 72 | 91 | 73 | 94 |
| E10 | 2094 | 2090 | 2086 | 1964 | 70 | 96 | 72 | 87 |
| E11 | 2014 | 2016 | 2012 | 1904 | 65 | 93 | 72 | 94 |

TABLE 10-continued

| Battery | | | | | | | |
|---|---|---|---|---|---|---|---|
| | | Charge And Discharge Characteristics | | Nail Penetration Safety | | | |
| | | | | Nail Speed 5 mm/s | | Nail Speed 180 mm/s | |
| | Designed | 400 mAh | 4000 mAh | Temperature Reached | | Temperature Reached | |
| Battery No. | Capacity (mAh) | Charge (mAh) | Discharge (mAh) | Discharge (mAh) | After 1 sec. (° C.) | After 90 sec. (° C.) | After 1 sec. (° C.) | After 90 sec. (° C.) |
| E12 | 1873 | 1874 | 1870 | 1764 | 74 | 94 | 71 | 90 |
| E13 | 1800 | 1797 | 1793 | 1679 | 71 | 89 | 73 | 94 |
| E14 | 1656 | 1653 | 1649 | 1486 | 68 | 87 | 71 | 90 |
| E15 | 2017 | 1848 | 1822 | 1472 | 71 | 95 | 73 | 91 |
| E16 | 2016 | 1988 | 1961 | 1737 | 65 | 88 | 69 | 91 |
| E17 | 2015 | 1999 | 1989 | 1812 | 70 | 94 | 72 | 89 |
| E18 | 2017 | 2019 | 2015 | 1894 | 70 | 93 | 68 | 88 |
| E19 | 2014 | 2015 | 2009 | 1884 | 73 | 91 | 73 | 88 |
| E20 | 2015 | 2015 | 2011 | 1888 | 69 | 88 | 74 | 92 |
| F1 | 2015 | 2014 | 2003 | 1888 | 146 | — | 138 | — |
| F2 | 1944 | 1939 | 1935 | 1812 | 81 | 151 | 69 | 93 |
| F3 | 2012 | 2014 | 2004 | 1881 | 88 | 147 | 76 | 101 |
| F4 | 2015 | 2016 | 2011 | 1897 | 76 | 141 | 73 | 94 |
| F5 | 1943 | 1941 | 1939 | 1821 | 74 | 94 | 72 | 89 |
| F6 | 1944 | 1911 | 1889 | 1759 | 70 | 93 | 69 | 90 |

(Results Consideration)

In the battery F1 having no porous film, the heat generation after 1 second was notable, regardless of the nail penetration speed. As opposed to this, in the batteries E1 and E2, in which the porous film was formed on the positive electrode or the negative electrode, the heat generation after the nail penetration was greatly suppressed. When all the batteries after the nail penetration test were disassembled and checked, in all batteries, the sheet separator melted in a widespread area. However, with regard to the batteries E1 and E2, the porous film kept its original shape.

On the other hand, in the battery F2, in which the porous film was formed on the separator, it could be seen that the heat generation was accelerated when the nail penetration speed was slow. When the battery F2 was disassembled and checked, it was confirmed that the porous film also deformed with the above mentioned melting of the separator.

With regard to the thickness of the porous film, in the battery E8 having a porous film with excessive thickness, since the length of the electrode plate forming the electrode plate group was shortened, the designed capacity declined and the capacity at the high-rate discharge declined.

In the battery E14 having a separator with an excessive thickness, since the electrode plate forming the electrode plate group shortened, the designed capacity greatly declined, and the capacity at the high-rate discharge greatly declined.

In the battery E15, in which the content of titanium oxide powder relative to the total of the titanium oxide powder and binder was small (binder amount was large), a capacity decline can be seen at the high-rate discharge. This is probably because the gaps between titanium oxide particles could not be secured due to the excessive amount of binder and caused the decline in ion conductivity of the porous film. However, when the content of titanium oxide powder is too large, the binder content becomes small, and the separation and chips of the porous film will probably be apt to occur.

In the battery F3 in which CMC was used and in the battery F4 in which PVDF was used as the binder in the porous film, the heat generation could not be suppressed when the nail penetration speed was slowed. When these batteries were disassembled and checked, it was confirmed that not only the separator, but the porous film was deformed as well.

In the battery F3, defective appearance due to the deformation of the negative electrode could be seen after the formation of the porous film. As is mentioned above, this is probably the results of the swelling of the thickener in the negative electrode due to the water included in the porous film before drying.

Additionally, in the battery F5 in which α-alumina was used instead of titanium oxide powder, it was confirmed that titanium oxide achieved various functions almost same as α-alumina. However, when α-alumina was used, battery performances varied as the porous film became thinner. Therefore, when the porous film is to be formed thin, titanium oxide is preferably used, instead of α-alumina.

The reason that battery performances varied as the porous film using α-alumina became thinner was probably that in α-alumina, the gaps having a pore size of 0.1 μm (100 nm) or less cannot be formed uniformly. This implies that a certain degree of thickness is necessary in the case of the porous film using α-alumina.

As shown by the battery F6, when PVDF was used as the second binder in the negative electrode, safety could be secured. However, the second binder content became inevitably large, and lithium ion acceptability of the negative electrode declined and the charge capacity gradually declined.

Example 5

Battery G1

(a) Preparation of Raw Material Paste of Porous Film

A raw material paste for porous film with a viscosity of 48 ps at 20 rpm measured by B-type viscometer (measurement temperature 25° C.) was prepared by mixing 970 g of alumina with a median diameter of 0.3 μm, 375 g of BM-720H (NMP solution containing 8 wt % of a rubber including a polyacrylonitrile chain as a first binder) manufactured by ZEON Corporation, and an appropriate amount of NMP in a double-arm kneader.

(b) Fabrication of Positive Electrode

A positive electrode material mixture paste was prepared by mixing 3 kg of lithium cobaltate, 1 kg of PVDF#1320 (NMP solution containing 12 wt % of PVDF) manufactured by Kureha Chemical Industry Co., Ltd. as a binder, 90 g of acetylene black, and an appropriate amount of NMP, with a double-arm kneader. This paste was applied on an aluminum foil with a thickness of 15 µm, and rolled after drying, to form a positive electrode material mixture layer. At this time, the thickness of an electrode plate comprising the aluminum foil and the material mixture layers was set as 160 µm. Afterwards, the electrode plate was slit to give a width which could be inserted into a can battery case of a cylindrical battery (product number 18650) to obtain a positive electrode hoop.

(c) Fabrication of Negative Electrode

A negative electrode material mixture paste was prepared by mixing 2 kg of artificial graphite, 1 kg of vapor growth carbon fiber (VGCF), 75 g of BM-400B (aqueous dispersion including 40 wt % of styrene-butadiene copolymer (second rubber particle) as a second binder) manufactured by ZEON Corporation, 30 g of CMC as a water-soluble polymer, and an appropriate amount of water with a double-arm kneader. This paste was applied on a copper foil with a thickness of 10 µm, and rolled after drying, to form a negative electrode material mixture layer. At this time, the electrode plate comprising the copper foil and the material mixture layers was set as 180 µm. Afterwards, the electrode plate was slit to give a width which could be inserted into the can battery case of the cylindrical battery (product number 18650), to obtain a negative electrode hoop.

(d) Formation of Porous Film

The raw material paste for porous film was applied on both sides of the negative electrode hoop to give a thickness of 5 µm per side adhered to the negative electrode surface to form a porous film with varied surface roughness.

(e) Preparation of Electrolyte

For the non-aqueous electrolyte, a solvent mixture in which ethylene carbonate, ethyl methyl carbonate, and dimethyl carbonate were mixed with a volume ratio of 1:1:1, dissolving lithium hexafluorophosphate (LiPF$_6$) to give a concentration of 1 mol/liter was used. Also, 3% by volume of vinylene carbonate relative to the solvent mixture was added to the non-aqueous electrolyte.

(f) Fabrication of Battery

The above positive electrode and negative electrode were cut to give a predetermined length, respectively, and were wound interposing a sheet separator with a thickness of 20 µm comprising a microporous film made of polyethylene, and then were inserted into the battery case. Then, 5.5 g of the above electrolyte was weighed, and injected into the battery case, and the opening of the case was sealed. A cylindrical-shape lithium ion secondary battery G1 was thus made.

Battery G2

A battery G2 was made in the same manner as the battery G1, except that the viscosity of the raw material paste for porous film was controlled to be 92 cp.

Battery G3

A battery G3 was made in the same manner as the battery G1, except that the viscosity of the raw material paste for porous film was controlled to be 150 cp.

Battery G4

A battery G4 was made in the same manner as the battery G1, except that the viscosity of the raw material paste for porous film was controlled to be 182 cp.

Battery G5

A battery G5 was made in the same manner as the battery G1, except that the viscosity of the raw material paste for porous film was controlled to be 253 cp.

Battery H1

A battery H1 was made in the same manner as the battery G1, except that the porous film was not formed on both sides of the negative electrode hoop.

Battery H2

A battery H2 was made in the same manner as the battery G1, except that the viscosity of the raw material paste for porous film was controlled to be 17 cp.

Battery H3

A battery H3 was made in the same manner as the battery G1, except that the viscosity of the raw material paste for porous film was controlled to be 443 cp.

Battery G6

A battery G6 was made in the same manner as the battery G3, except that the same raw material paste used in the battery G3 was used to form the porous film with a thickness of 0.3 µm on both sides of the negative electrode.

Battery G7

A battery G7 was made in the same manner as the battery G3, except that the same raw material paste used in the battery G3 was used to form the porous film with a thickness of 0.5 µm on both sides of the negative electrode.

Battery G8

A battery G8 was made in the same manner as the battery G3, except that the same raw material paste used in the battery G3 was used to form the porous film with a thickness of 1 µm on both sides of the negative electrode.

Battery G9

A battery G9 was made in the same manner as the battery G3, except that the same raw material paste used in the battery G3 was used to form the porous film with a thickness of 10 µm on both sides of the negative electrode.

Battery G10

A battery G10 was made in the same manner as the battery G3, except that the same raw material paste used in the battery G3 was used to form the porous film with a thickness of 15 µm on both sides of the negative electrode.

Battery G11

A battery G11 was made in the same manner as the battery G3, except that the same raw material paste used in the battery G3 was used to form the porous film with a thickness of 20 µm on both sides of the negative electrode.

Battery G12

A battery G12 was made in the same manner as the battery G3, except that the same raw material paste used in the battery G3 was used to form the porous film with a thickness of 30 µm on both sides of the negative electrode.

Battery G13

A battery G13 was made in the same manner as the battery G3, except that the thickness of the sheet separator was set as 6 µm.

Battery G14

A battery G14 was made in the same manner as the battery G3, except that the thickness of the sheet separator was set as 8 µm.

Battery G15

A battery G15 was made in the same manner as the battery G3, except that the thickness of the sheet separator was set as 10 µm.

Battery G16

A battery G16 was made in the same manner as the battery G3, except that the thickness of the sheet separator was set as 15 µm.

Battery G17
A battery G17 was made in the same manner as the battery G3, except that the thickness of the sheet separator was set as 25 μm.

Battery G18
A battery G18 was made in the same manner as the battery G3, except that the thickness of the sheet separator was set as 30 μm.

Battery G19
A battery G19 was made in the same manner as the battery G3, except that the thickness of the sheet separator was set as 40 μm.

Battery G20
A battery G20 was made in the same manner as the battery G3, except that the filler content relative to the total of the filler and the first binder was set as 30 wt %, and a raw material paste with a viscosity of 150 ps at 20 rpm was prepared and used.

Battery G21
A battery G21 was made in the same manner as the battery G3, except that the filler content relative to the total of the filler and the first binder was set as 50 wt %, and a raw material paste with a viscosity of 150 ps at 20 rpm was prepared and used.

Battery G22
A battery G22 was made in the same manner as the battery G3, except that the filler content relative to the total of the filler and the first binder was set as 70 wt %, and a raw material paste with a viscosity of 150 ps at 20 rpm was prepared and used.

Battery G23
A battery G23 was made in the same manner as the battery G3, except that the filler content relative to the total of the filler and the first binder was set as 90 wt %, and a raw material paste with a viscosity of 150 ps at 20 rpm was prepared and used.

Battery G24
A battery G24 was made in the same manner as the battery G3, except that the filler content relative to the total of the filler and the first binder was set as 95 wt %, and a raw material paste with a viscosity of 150 ps at 20 rpm was prepared and used.

Battery G25
A battery G25 was made in the same manner as the battery G3, except that the filler content relative to the total of the filler and the first binder was set as 99 wt %, and a raw material paste with a viscosity of 150 ps at 20 rpm was prepared and used.

Battery H4
A battery H4 was made in the same manner as the battery G3, except that the filler content relative to the total of the filler and the first binder was set as 99.5 wt %, and a raw material paste with a viscosity of 150 ps at 20 rpm was prepared and used.

Battery G26
A battery G26 was made in the same manner as the battery G3, except that water-soluble CMC was used instead of BM-720H as a binder, and a raw material paste for porous film with a viscosity of 150 ps at 20 rpm was prepared and used. Herein, as a dispersion medium for the raw material paste, water was used instead of NMP.

Battery G27
A battery G27 was made in the same manner as the battery G3, except that water-insoluble PVDF (crystalline melting point of 174° C.) was used instead of BM-720H as a binder, and the raw material paste for porous film with a viscosity of 150 ps at 20 rpm was prepared and used.

Battery H5
A battery H5 was made in the same manner as the battery G3, except that polyethylene beads with a median diameter of 0.3 μm was used instead of the alumina with a median diameter of 0.3 μm as the filler, and a raw material paste for porous film with a viscosity of 150 ps at 20 rpm was prepared and used.

Battery G28
A battery G28 was made in the same manner as the battery G3, except that titania with a median diameter of 0.3 μm was used instead of the alumina with a median diameter of 0.3 μm as the filler, and a raw material paste for porous film with a viscosity of 150 ps at 20 rpm was prepared and used.

Battery G29
In the fabrication of the negative electrode, instead of BM400B and CMC as a second binder, 8 wt % of PVDF relative to the negative electrode active material was used. Herein, for PVDF, PVDF#1320 used for the binder of the positive electrode was used. Other than the above, a battery G29 was made in the same manner as the battery G3.

(Evaluation)
The configuration of the porous film is summarized and shown in Table 11. Additionally, the thickness of the sheet separator and the kinds of the second binder used for the negative electrode are summarized and shown in Table 12.

TABLE 11

| | Porous Film | | | | | | |
|---|---|---|---|---|---|---|---|
| | | | | | | First Binder | |
| Battery No. | Paste Viscosity (ps) | Film Thickness (μm) | Filler Kind | Content (wt %) | Kind | Crystalline Melting Point (° C.) | Decomposition Temperature (° C.) |
| G1 | 48 | 5 | Alumina | 97 | BM720H | None | 320 |
| G2 | 92 | 5 | Alumina | 97 | BM720H | None | 320 |
| G3 | 150 | 5 | Alumina | 97 | BM720H | None | 320 |
| G4 | 182 | 5 | Alumina | 97 | BM720H | None | 320 |
| G5 | 253 | 5 | Alumina | 97 | BM720H | None | 320 |
| G6 | 150 | 0.3 | Alumina | 97 | BM720H | None | 320 |
| G7 | 150 | 0.5 | Alumina | 97 | BM720H | None | 320 |
| G8 | 150 | 1 | Alumina | 97 | BM720H | None | 320 |
| G9 | 150 | 10 | Alumina | 97 | BM720H | None | 320 |
| G10 | 150 | 15 | Alumina | 97 | BM720H | None | 320 |
| G11 | 150 | 20 | Alumina | 97 | BM720H | None | 320 |
| G12 | 150 | 30 | Alumina | 97 | BM720H | None | 320 |

TABLE 11-continued

| | | | Porous Film | | | |
|---|---|---|---|---|---|---|
| | | | | | First Binder | |
| Battery No. | Paste Viscosity (ps) | Film Thickness (μm) | Filler Kind | Content (wt %) | Kind | Crystalline Melting Point (° C.) | Decomposition Temperature (° C.) |

| Battery No. | Paste Viscosity (ps) | Film Thickness (μm) | Filler Kind | Content (wt %) | Kind | Crystalline Melting Point (° C.) | Decomposition Temperature (° C.) |
|---|---|---|---|---|---|---|---|
| G13 | 150 | 5 | Alumina | 97 | BM720H | None | 320 |
| G14 | 150 | 5 | Alumina | 97 | BM720H | None | 320 |
| G15 | 150 | 5 | Alumina | 97 | BM720H | None | 320 |
| G16 | 150 | 5 | Alumina | 97 | BM720H | None | 320 |
| G17 | 150 | 5 | Alumina | 97 | BM720H | None | 320 |
| G18 | 150 | 5 | Alumina | 97 | BM720H | None | 320 |
| G19 | 150 | 5 | Alumina | 97 | BM720H | None | 320 |
| G20 | 150 | 5 | Alumina | 30 | BM720H | None | 320 |
| G21 | 150 | 5 | Alumina | 50 | BM720H | None | 320 |
| G22 | 150 | 5 | Alumina | 70 | BM720H | None | 320 |
| G23 | 150 | 5 | Alumina | 90 | BM720H | None | 320 |
| G24 | 150 | 5 | Alumina | 95 | BM720H | None | 320 |
| G25 | 150 | 5 | Alumina | 99 | BM720H | None | 320 |
| G26 | 150 | 5 | Alumina | 97 | CMC | None | 245 |
| G27 | 150 | 5 | Alumina | 97 | PVDF | 174 | 360 |
| G28 | 150 | 5 | Titania | 97 | BM720H | None | 320 |
| G29 | 150 | 5 | Alumina | 97 | BM720H | None | 320 |
| H1 | — | — | — | — | — | — | — |
| H2 | 17 | 5 | Alumina | 97 | BM720H | None | 320 |
| H3 | 443 | 5 | Alumina | 97 | BM720H | None | 320 |
| H4 | 150 | 5 | Alumina | 99.5 | BM720H | None | 320 |
| H5 | 150 | 5 | PE beads | 97 | BM720H | None | 320 |

TABLE 12

| Battery No. | Separator Thickness (μm) | Negative Electrode Binder | Porous Film Adhesiveness | Flexibility (No. of Defects) | Negative Electrode Appearance | Surface Roughness (μm) | |
|---|---|---|---|---|---|---|---|
| | | | | | | Negative Electrode | Porous Film |
| G1 | 20 | BM400B + CMC | OK | 1 | No Change | 2.43 | 1.77 |
| G2 | 20 | BM400B + CMC | OK | 0 | No Change | 2.43 | 0.83 |
| G3 | 20 | BM400B + CMC | OK | 0 | No Change | 2.43 | 0.55 |
| G4 | 20 | BM400B + CMC | OK | 0 | No Change | 2.43 | 0.96 |
| G5 | 20 | BM400B + CMC | OK | 1 | No Change | 2.43 | 1.84 |
| G6 | 20 | BM400B + CMC | OK | 0 | No Change | 2.43 | 2.21 |
| G7 | 20 | BM400B + CMC | OK | 0 | No Change | 2.43 | 2.05 |
| G8 | 20 | BM400B + CMC | OK | 0 | No Change | 2.43 | 1.31 |
| G9 | 20 | BM400B + CMC | OK | 0 | No Change | 2.43 | 0.46 |
| G10 | 20 | BM400B + CMC | OK | 0 | No Change | 2.43 | 0.40 |
| G11 | 20 | BM400B + CMC | OK | 0 | No Change | 2.43 | 0.35 |
| G12 | 20 | BM400B + CMC | OK | 1 | No Change | 2.43 | 0.41 |
| G13 | 6 | BM400B + CMC | OK | 0 | No Change | 2.43 | 0.55 |
| G14 | 8 | BM400B + CMC | OK | 0 | No Change | 2.43 | 0.55 |
| G15 | 10 | BM400B + CMC | OK | 0 | No Change | 2.43 | 0.55 |
| G16 | 15 | BM400B + CMC | OK | 0 | No Change | 2.43 | 0.55 |
| G17 | 25 | BM400B + CMC | OK | 0 | No Change | 2.43 | 0.55 |
| G18 | 30 | BM400B + CMC | OK | 0 | No Change | 2.43 | 0.55 |
| G19 | 40 | BM400B + CMC | OK | 0 | No Change | 2.43 | 0.55 |
| G20 | 20 | BM400B + CMC | OK | 0 | No Change | 2.43 | 0.81 |
| G21 | 20 | BM400B + CMC | OK | 0 | No Change | 2.43 | 0.62 |
| G22 | 20 | BM400B + CMC | OK | 0 | No Change | 2.43 | 0.60 |
| G23 | 20 | BM400B + CMC | OK | 0 | No Change | 2.43 | 0.48 |
| G24 | 20 | BM400B + CMC | OK | 0 | No Change | 2.43 | 0.43 |
| G25 | 20 | BM400B + CMC | OK | 1 | Changed | 2.43 | 0.71 |
| G26 | 20 | BM400B + CMC | OK | 4 | No Change | 2.43 | 0.57 |
| G27 | 20 | BM400B + CMC | OK | 3 | No Change | 2.43 | 0.36 |
| G28 | 20 | BM400B + CMC | OK | 0 | No Change | 2.43 | 0.60 |
| G29 | 20 | PVDF | OK | 2 | No Change | 2.28 | 0.52 |
| H1 | 20 | BM400B + CMC | — | 6 | No Change | 2.43 | — |
| H2 | 20 | BM400B + CMC | OK | 7 | No Change | 2.43 | 2.57 |
| H3 | 20 | BM400B + CMC | OK | 6 | — | 2.43 | 3.61 |
| H4 | 20 | BM400B + CMC | NG | — | No Change | 2.43 | 0.48 |
| H5 | 20 | BM400B + CMC | OK | 0 | No Change | 2.43 | 0.61 |

(Evaluation)

[Surface Roughness]

The surface roughness of the negative electrode surface before applying the porous film and the surface roughness of the porous film formed thereon after drying are measured respectively by a non-contact type surface roughness measuring instrument, to obtain an average roughness Ra. The results are shown in Table 12.

Also, for the above produced porous film and the completed lithium ion secondary battery, porous film adhesiveness, negative electrode appearance, porous film flexibility, battery designed capacity, charge and discharge characteristics of the battery, and the nail penetration safety were evaluated in the same manner as Example 2. The results are shown in Tables 12 to 13.

With regard to the thickness of the porous film, in the battery G12 having an excessively thick porous film, due to the shortened length of the electrode plate forming the electrode plate group, designed capacity decreased and the capacity at the high-rate discharge declined.

In the battery G19 in which the thickness of the separator was excessively large, due to the shortened length of the electrode plate forming the electrode plate group, the designed capacity decreased greatly and the capacity at the high-rate discharge declined.

Then, in the battery G20 in which the filler content relative to the total of the filler and the first binder was small (binder amount was large), the decline in the capacity at the high-rate discharge could be seen. This is probably because the gaps between the filler particles could not be obtained sufficiently

TABLE 13

| | Battery | | | | | | | |
|---|---|---|---|---|---|---|---|---|
| | | | | | Nail Penetration Safety | | | |
| | | | | | Nail Speed 5 mm/s Temperature Reached | | Nail Speed 180 mm/s Temperature Reached | |
| | | Charge and Discharge Characteristics | | | | | | |
| Battery No. | Designed Capacity (mAh) | Charge (mAh) | 400 mAh Discharge (mAh) | 4000 mAh Discharge (mAh) | After 1 sec. (° C.) | After 90 sec. (° C.) | After 1 sec. (° C.) | After 90 sec. (° C.) |
| G1 | 1940 | 1933 | 1931 | 1829 | 75 | 89 | 76 | 91 |
| G2 | 1936 | 1932 | 1930 | 1832 | 77 | 93 | 68 | 88 |
| G3 | 1941 | 1940 | 1936 | 1847 | 74 | 94 | 69 | 97 |
| G4 | 1945 | 1941 | 1940 | 1842 | 72 | 92 | 77 | 94 |
| G5 | 1939 | 1933 | 1931 | 1839 | 71 | 86 | 68 | 89 |
| G6 | 2010 | 2011 | 2008 | 1887 | 68 | 123 | 68 | 89 |
| G7 | 2011 | 2010 | 2006 | 1899 | 73 | 88 | 71 | 94 |
| G8 | 2012 | 1999 | 1996 | 1901 | 70 | 89 | 74 | 93 |
| G9 | 1875 | 1875 | 1874 | 1779 | 68 | 94 | 72 | 90 |
| G10 | 1806 | 1799 | 1796 | 1708 | 71 | 95 | 73 | 87 |
| G11 | 1735 | 1730 | 1728 | 1642 | 69 | 94 | 77 | 91 |
| G12 | 1584 | 1581 | 1574 | 1386 | 71 | 96 | 72 | 88 |
| G13 | 2157 | 2151 | 2146 | 2010 | 72 | 131 | 76 | 109 |
| G14 | 2131 | 2124 | 2119 | 1989 | 73 | 87 | 71 | 90 |
| G15 | 2093 | 2090 | 2086 | 1962 | 71 | 87 | 69 | 90 |
| G16 | 2016 | 2016 | 2012 | 1902 | 68 | 95 | 67 | 88 |
| G17 | 1874 | 1874 | 1870 | 1760 | 69 | 94 | 70 | 97 |
| G18 | 1799 | 1797 | 1792 | 1679 | 72 | 88 | 68 | 88 |
| G19 | 1656 | 1653 | 1649 | 1488 | 74 | 89 | 72 | 84 |
| G20 | 1939 | 1938 | 1936 | 1491 | 73 | 91 | 71 | 85 |
| G21 | 2014 | 1988 | 1961 | 1737 | 68 | 95 | 75 | 96 |
| G22 | 2015 | 1999 | 1989 | 1811 | 68 | 97 | 77 | 94 |
| G23 | 2015 | 2019 | 2015 | 1893 | 73 | 95 | 66 | 97 |
| G24 | 2015 | 2015 | 2009 | 1883 | 76 | 93 | 79 | 97 |
| G25 | 2017 | 2015 | 2010 | 1886 | 68 | 85 | 68 | 90 |
| G26 | 1941 | 1939 | 1938 | 1809 | 87 | 122 | 85 | 99 |
| G27 | 1943 | 1940 | 1939 | 1820 | 75 | 130 | 74 | 97 |
| G28 | 2016 | 2012 | 2005 | 1880 | 71 | 95 | 73 | 89 |
| G29 | 2014 | 1961 | 1958 | 1788 | 72 | 91 | 77 | 96 |
| H1 | 2014 | 2014 | 2003 | 1888 | 145 | — | 145 | — |
| H2 | 1944 | 1939 | 1936 | 1818 | 77 | 147 | 74 | 93 |
| H3 | 1938 | 1937 | 1931 | 1819 | 73 | 143 | 71 | 93 |
| H4 | — | — | — | — | — | — | — | — |
| H5 | 1944 | 1943 | 1939 | 1822 | 149 | — | 139 | — |

(Results Consideration)

In the battery H1 having no porous film, the heat generation after 1 second was notable, regardless of the nail penetration speed. As opposed to this, in the battery G3 in which the porous film was formed on the negative electrode, the heat generation after the nail penetration was greatly suppressed. When all the batteries after the nail penetration test were disassembled and checked, the sheet separator melted in a widespread area in all the batteries. However, with regard to the battery G3, the porous film kept its original shape.

due to the excessive first binder, to cause the decline in ion conductivity of the porous film. As oppose to this, in the battery H4 in which the amount of the binder was too small, separations and chips of the porous film occurred frequently, due to the insufficient binding effects.

In the battery G26 in which CMC was used and the battery G27 in which PVDF was used as a first binder in the porous film, the heat generation could not be suppressed when the nail penetration speed was slowed. When these batteries were disassembled and checked, it was confirmed that the porous film also deformed, in addition to the separator.

Although in the battery G3 in which the binder had rubber elasticity, the porous film after winding kept its shape sufficiently and showed no defects, in the batteries G26 and G27, evaluation of flexibility for the porous film showed poor results. Further, in the battery G26, defective appearances due to the deformation of the negative electrode were seen after the formation of the porous film.

Also, in the battery G28 in which titania was used instead of alumina as a filler, it was confirmed that titania achieved various functions same as alumina. On the other hand, in the battery H5 in which polyethylene beads (PE beads) were used, with regard to the nail penetration safety, it was the same level as the battery H1 having no porous film.

Then, in the battery G29 in which PVDF was used as the second binder, the binder content in the negative electrode became inevitably large, to cause a decrease in lithium ion acceptability of the negative electrode, and a gradual decrease in the charging capacity. Additionally, based on the properties of PVDF, the negative electrode plate hardened, thereby failing to make full use of the flexibility of the porous film.

Surface roughness of the porous film is discussed next.

Since all the negative electrodes used in this Example included a great amount of VGCF aiming an improvement of conductivity, surface roughness of the negative electrode was large. Separation of material mixture occurs easily in such negative electrode, due to frictions at the time of winding. However, in the case of the battery in which the raw material paste for porous film is controlled to have an appropriate range of viscosity, a smooth porous film is disposed on the negative electrode. Thus, the decrease in yields due to the separation of the material mixture is suppressed. In the batteries G1 to G28, surface roughness of the porous film was regulated to become smaller than the surface roughness of the electrode plate.

On the other hand, in the battery H2 in which the viscosity of the raw material paste for porous film to be applied on the negative electrode was too small, the separation of the material mixture could not be avoided. This is because the asperities of the negative electrode surface were not smoothed by the porous film due to the raw material paste with a large fluidity. Additionally, in the battery H3 in which the viscosity of the raw material paste was excessively large, the surface roughness of the porous film increased. This is because the raw material paste was caught in the asperities of the negative electrode surface due to the poor fluidity of the raw material paste. Thus, the separation of the material mixture could not be avoided.

In the battery H3 in which the separation of the material mixture did not occur, the acceleration of heat generation could be seen in the nail penetration test as well. This is because uneven application occurred together with the increase in the surface roughness of the porous film. Since the uneven application involves a partial void in the porous film, the functions of the porous film to improve the safety is probably decreased.

Upon comparing the G6 and G7, it can be said that the average roughness Ra of below 2.1 μm is desirable for the surface roughness of the porous film.

Herein, although the surface roughness of the porous film was changed based on the viscosity of the raw material paste, the optimal viscosity range easily changes depending upon the change in the composition of the porous film. Therefore, the viscosity range is not to be limited by this embodiment.

INDUSTRIAL APPLICABILITY

A lithium ion secondary battery of the present invention comprises a negative electrode having a high lithium ion acceptability, has a higher safety level, and can achieve a higher yield. Thus, the present invention is useful in the field which requires a higher safety and high-rate characteristic at the same time, especially as a power source for portable electric devices and the like.

The invention claimed is:

1. A lithium ion secondary battery comprising:
    a positive electrode for absorbing and desorbing lithium ion;
    a negative electrode for absorbing and desorbing lithium ion;
    a porous film interposed between said positive electrode and said negative electrode, the porous film having a thickness of 0.5 to 20 μm;
    a sheet separator interposed between said positive electrode and said porous film, the sheet separator having a thickness of 8 to 25 μm and being made of a polyolefin resin; and
    a non-aqueous electrolyte;
    wherein said porous film is adhered to a surface of at least said negative electrode,
    a total thickness of said sheet separator and said porous film is 15 to 30 μm,
    said porous film comprises an inorganic filler and a first binder, said inorganic filler having an alkaline site on the surface thereof, a content of said first binder in said porous film being 1.5 to 4 parts by weight per 100 parts by weight of said filler,
    said first binder comprises core-shell type particles of acrylonitrile-acrylate copolymer having a polyacrylonitrile chain as a first rubber, said first rubber being water-insoluble and having a decomposition temperature of 250° C. or higher, said core-shell type particles each having an acidic group on the surface thereof, said acidic group bonding with the alkaline site of said inorganic filler,
    said negative electrode comprises a negative electrode active material for absorbing and desorbing lithium ion and a second binder,
    said second binder includes a second rubber particle comprising a polymer including a styrene unit and a butadiene unit, and a water-soluble polymer comprising a polymer including a methylcellulose unit, and
    a content of said second binder in said negative electrode is 1.5 to 3 parts by weight per 100 parts by weight of said negative electrode active material.

2. The lithium ion secondary battery in accordance with claim 1, wherein said first rubber has a crystalline melting point of 250° C. or more.

3. The lithium ion secondary battery in accordance with claim 1, wherein said inorganic filler comprises an inorganic oxide.

4. The lithium ion secondary battery in accordance with claim 3, wherein a surface of said inorganic oxide has a BET specific surface area of 0.9 $m^2/g$ or more.

5. The lithium ion secondary battery in accordance with claim 1, wherein said inorganic oxide includes at least one selected from the group consisting of alumina and titanium oxide.

6. The lithium ion secondary battery in accordance with claim 1, wherein a surface roughness of said porous film is less than a surface roughness of an electrode surface to which said porous film is adhered to.

7. The lithium ion secondary battery in accordance with claim 1, wherein said inorganic filler comprises a mixture of a large particle group and a small particle group, and an average particle size A of said large particle group and an average particle size B of said small particle group satisfy the formula (1):

$$0.05 \leq B/A \leq 0.25.$$

8. The lithium ion secondary battery in accordance with claim 1, wherein said positive electrode and said negative electrode are wound with said porous film interposed therebetween.

9. The lithium ion secondary battery in accordance with claim 1, wherein the acrylate of the core-shell type particles forms an acidic group on a surface of the core-shell type particles.

* * * * *